Figure 1:
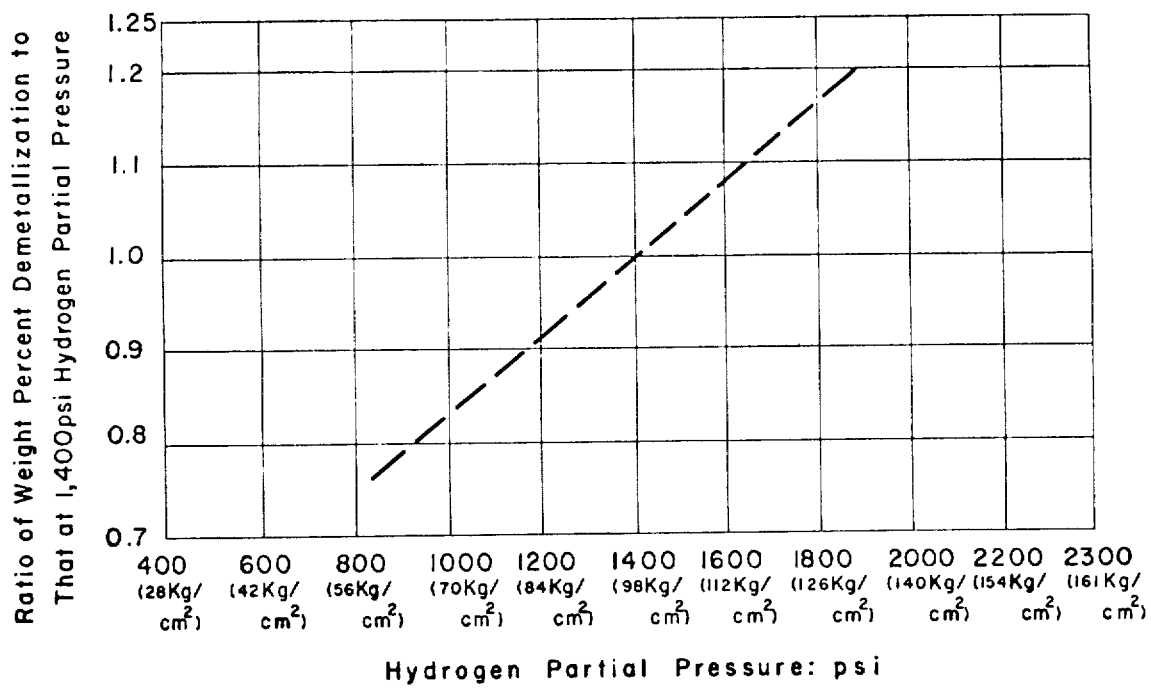

United States Patent
Frayer et al.

[11] 3,876,530
[45] Apr. 8, 1975

[54] MULTIPLE STAGE HYDRODESULFURIZATION WITH GREATER SULFUR AND METAL REMOVAL IN INITIAL STAGE

[75] Inventors: James A. Frayer, Indiana Township, Pittsburgh, Pa.; Daniel Y. Ko, Newark, Del.; John A. Paraskos, McCandless Township, Pittsburgh, Pa.

[73] Assignee: Gulf Research & Development Company, Pittsburgh, Pa.

[22] Filed: Aug. 22, 1973

[21] Appl. No.: 390,481

[52] U.S. Cl. ............................ 208/210; 208/251 H
[51] Int. Cl. .................................... C10g 23/02
[58] Field of Search ................ 208/210, 211, 251 H

[56] References Cited
UNITED STATES PATENTS

| | | |
|---|---|---|
| 3,563,886 | 2/1971 | Carlson et al. ............... 208/210 |
| 3,663,434 | 5/1972 | Bridge ........................ 208/210 |
| 3,730,879 | 5/1973 | Christman et al. ............. 208/210 |
| 3,775,303 | 11/1973 | McKinney et al. ............. 208/216 |

Primary Examiner—Paul M. Coughlan, Jr.
Assistant Examiner—G. J. Crasanakis

[57] ABSTRACT

A multiple stage process is described for the catalytic hydrodesulfurization and hydrodemetallization of a residual petroleum oil boiling above the gasoline range. The product of the process comprises essentially material boiling above the gasoline range and comprises little material boiling below the initial boiling point of the residual oil feed. The hydrodesulfurization-demetallization process comprises an initial stage involving relatively high hydrogen pressure in the presence of a catalyst comprising a relatively low proportion of catalytically active hydrogenation metals in which demetallization activity is high with an unaged catalyst but diminishes as the catalyst becomes aged. The process employs a final stage in series having a relatively lower hydrogen pressure and a catalyst comprising a relatively higher proportion of hydrogenation metals in which the demetallization activity is lower with an unaged catalyst but increases as the catalyst becomes aged. The stream entering the final stage contains an amount up to 10, 20 or even 25 weight percent of the asphaltene content of the charge to the first stage while the effluent from the final stage is essentially free of asphaltenes.

14 Claims, 13 Drawing Figures

EFFECT OF HYDROGEN PRESSURE ON DEMETALLIZATION WITH UNAGED CATALYST

EFFECT OF AGING ON DEMETALLIZATION RELATIVE TO DESULFURIZATION AT SEVERAL HYDROGEN PRESSURES

MULTIPLE STAGE HYDRODESULFURIZATION WITH GREATER SULFUR AND METAL REMOVAL IN INITIAL STAGE

This invention is related to five other applications filed on even date herewith. The five other applications are "Plural Stage Residue Hydrodesulfurization Process" in the names of Robert D. Cristman, Alfred M. Henke, John. A. Paraskos, Geoffrey R. Wilson and Stephen J. Yanik; "Plural Stage Residue Hydrodesulfurization Process With Hydrogen Sulfide Addition and Removal" in the names of Robert D. Christman and Stephen J. Yanik; "Process For Producing a Lubricating Oil From a Residue Feed" in the names of Harry C. Murphy, Jr., Robert A. Plundo, Herman Taylor, Jr., Harry C. Stauffer and Stephen J. Yanik; "Combination Residue Hydrodesulfurization and Zeolite Riser Cracking Process" in the names of Alfred M. Henke and Joel D. McKinney and "Process For Producing a Zeolite Riser Cracker Feed From a Residual Oil" in the names of Alfred M. Henke and Joel D. McKinney. The Ser. Nos. of these applications are 390,362; 390,361; 390;360; 390,359; and 390,358, respectively.

This invention is based upon the hydrodesulfurization of asphaltene-containing residual petroleum oils having relatively high sulfur and metal contents. The residual oils boil above the gasoline range and can have a boiling point of 375°F.+ (191°C.+), 400°F.+ (204°C.+), 650°F.+ (343°C.+) or even 1050°F.+ (565°C.+).

The present invention is based upon a multiple stage hydrodesulfurization process wherein the effluent from the final hydrodesulfurization stage is essentially free of asphaltenes as determined by pentane extraction and contains less than about 1, generally, or preferably less than about 0.6 ppm of nickel equivalent (nickel equivalent is equal to the ppm by weight of nickel plus one-fifth the ppm by weight of vanadium which is present). The metals content from the effluent of the final hydrodesulfurization stage is so low that the total final stage effluent without dilution can be employed as the entire stream to a fluid catalytic cracking (FCC) process employing a zeolite catalyst in a riser wherein the catalyst and hydrocarbon flow at about the same velocity without catalyst build-up due to catalyst slippage within the riser and without an increase in catalyst to oil ratio in the riser. In the FCC process the buildup of nickel and vanadium on the zeolite catalyst is so low when charging undiluted hydrodesulfurization effluent that the zeolite catalyst make-up rate iis no more than about 0.2 pounds of zeolite catalyst per barrel of feed (571 g/m³) to the FCC riser. This zeolite catalyst make-up rate level is no higher than the normally required zeolite catalyst make-up rate in an FCC riser operation employing a distillate gas oil as the entire feed stream. Of course, the total hydrodesulfurization effluent can be blended with other streams prior to FCC.

If desired, the present invention can be employed for desulfurization of a full crude oil in the same unit or in separate units. For example, a 650°F.+(343°C.+) metals containing residual oil can be hydrodesulfurized in a first unit according to the present invention while the lighter distillate or a portion thereof can be hydrodesulfurized separately without the problems of metals contamination and high catalyst deactivation. Thereupon, the desulfurized distillate or a portion thereof and the desulfurized residuum can be reblended to provide a total desulfurized crude for use as a fuel oil or to provide a blended residual and distillate oil low in sulfur and boiling above the gasoline range for feeding to an FCC unit. If a full crude is charged to a single unit, the gasoline in the effluent is removed by distillation and utilized without cracking.

It is a characteristic of the present operation that the hydrodesulfurization process performs very little hydrocracking of feed oil boiling above the gasoline range, i.e. above about 375°F. (191°C.) or 400°F. (204°C.) to gasoline or lighter materials, i.e. to materials boiling below 375°F.(191°C.) or 400°F. (204°C.). This is an important feature of the present process since cracking of feed oil in the hydrodesulfurization operation involves the consumption of hydrogen which is wasteful, whereas, if cracking is deferred until the stream reaches the FCC unit, gasoline is produced without consumption of hydrogen and without addition of extraneous hydrogen to the FCC unit. Furthermore, gasoline produced in the FCC unit without added hydrogen has a higher octane value than gasoline produced by cracking in the presence of added hydrogen. Therefore, the function of the hydrodesulfurization unit is confined to the removal of sulfur, metals and asphaltenes rather than the production of gasoline and the function of the FCC unit is confined predominantly to the production of gasoline and also to low-sulfur fuel oil with a greater gasoline selectivity based on feed than if a distillate gas oil feed only were charged to FCC, although the zeolite catalyst to feed ratio requirement in the FCC riser is not increased to obtain this greater gasoline selectively in spite of the fact that the entire bottoms portion is being processed in the FCC riser.

While hydrogen is charged to the hydrodesulfurization process, no hydrogen is charged to the FCC process. The hydrodesulfurization process is essentially free of hydrocracking of feed components boiling above the gasoline range feed to material boiling within or below the gasoline range feed. In the hydrodesulfurization process not more than 20 percent, generally, of feed components boiling above the gasoline range, or preferably, not more than 10 percent, and most preferably, not more than 2 to 5 percent of feed components to the hydrodesulfurization process boiling above the gasoline range are converted to gasoline range or lighter materials. The hydrodesulfurization process is so free of hydrocracking to lighter materials that when charging atmospheric tower bottoms, i.e. 650°F.+ (343°C.+) residue, not more than 25 or 35 percent of this feed will be converted to material boiling below 650°F. (343°C.) and preferably not more than 20 or 30 percent of this feed will be converted to material boiling below 650°F. (343°C.). It is therefore seen that the hydrodesulfurization process is capable of hydrodesulfurization to produce an effluent wherein 70 or 80 percent by volume of the feed is recovered having a boiling point at least as high as the initial boiling point of the hydrodesulfurization feed oil.

In accordance with the present invention, it is shown that in the hydrodesulfurization process at start-of-run with a fresh catalyst, the weight percentage of demetallization increases generally uniformly with increases in hydrogen partial pressure. Since most of the metal content of the residual oil is generally present in the asphaltenes present in the residual oil (the residual oil comprising relatively low boiling saturates and aromatics plus higher boiling resins and asphaltenes) this means that as the hydrogen partial pressure is increased and the asphaltene content of the hydrodesulfurization effluent decreases the metals content of the residue also decreases.

The present invention employs a hydrodesulfurization catalyst having essentially no cracking activity. The hydrodesulfurization catalyst comprises at least one Group VIII metal and at least one Group VI metal on an alumina support containing less than 1 weight percent silica. Preferably, the support contains less than 0.5 weight percent silica, and most preferably, the support contains as low as 0.1 weight percent silica. The support can be essentially alumina. It is important that the support be sufficiently free of silica so that the catalyst is essentially devoid of ability to hydrocrack the feed below its initial boiling point.

The present invention is based upon the surprising discovery that in hydrodesulfurization the increase in weight percent demetallization in a residue oil feed with increases in hydrogen partial pressure is a transitory phenomenon only. In accordance with this invention, the unexpected discovery is disclosed that as the catalyst ages the reverse situation rapidly occurs. That is, at the higher hydrogen partial pressures, whereat at the beginning of the run the weight percentage of demetallization is the highest, catalyst aging tends to reduce this high ratio so that the longer the catalyst ages at a high hydrogen partial pressure the greater the fall off in weight ratio of demetallization to desulfurization. Furthermore, the higher the initial hydrogen partial pressure the more rapid is the fall off in weight ratio of demetallization to desulfurization during catalyst aging.

In contrast, relatively low hydrogen partial pressures, which at start of run conditions produce a reduced weight percentage of demetallization, exhibit an increase in weight ratio of demetallization to desulfurization in the feed upon catalyst aging. Furthermore, within the hydrogen pressure limits of this invention, the lower the hydrogen partial pressure the more rapid is the increase in weight ratio of demetallization to desulfurization upon catalyst aging. In accordance with this invention, it is important that for optimum demetallization in the relatively low pressure stages wherein operations preferential to demetallization are desired, that the hydrogen partial pressure not be permitted to be too low because if the initial rate of demetallization is too low the increase in demetallization selectivity upon catalyst aging is unable to effectively overcome the initial disadvantage within an acceptably short catalyst aging period. Furthermore, the hydrogen partial pressure should not be so low in a hydrodesulfurization stage of this invention that excessive and continual coke build-up on the catalyst is permitted to occur which would lead to an excessively short cycle life in the catalyst. The hydrogen partial pressure can be sufficiently low to permit appreciable catalyst coke formation whereby when equilibrium is achieved the level of coke on the catalyst stabilizes so that catalyst coke is removed by hydrogenation and leaves the catalyst surface at about the same rate that new coke forms on the catalyst surface.

The present multiple stage hydrodesulfurization process requires that the initial stage have a hydrogen partial pressure which is higher than the hydrogen partial pressure of the final stage. This is in direct contrast to U.S. Pat. No. 3,155,608 which is a prior art hydrodesulfurization patent employing multiple stages, which disposes hydrogen recycle and fresh hydrogen streams to produce a higher hydrogen pressure in the final stage than in the initial stage. The pressure drop of this invention can be accomplished by interstage flashing, restrictive pressure drop lines and by regard to points of recycle of pressurized purified hydrogen or of introduction of fresh hydrogen. Since the hydrogen partial pressure is lower in the final stage and since excessively low hydrogen partial pressures are conducive to continual coke build-up on the catalyst, it is not only necessary that the hydrogen partial pressure in the final stage not be so low that a continual build-up of coke is permitted but also that the catalyst in the final stage have a different composition to impart a higher hydrogenation activity as compared to the catalyst in the first stage. Since the catalyst in the first stage is relatively protected against excessive coke formation and coke build-up with aging due to elevated hydrogen partial pressure and since its desulfurization rate is also assisted by relatively high hydrogen partial pressure, the first stage catalyst requires a lower Group VI and Group VIII metal content than the content of Group VI and Group VIII metal on the catalyst in the final stage of the hydrodesulfurization process to balance the aging cycles between the stages and to avoid needlessly excessive active metals deposit on the first stage catalyst, which is economically wasteful. Furthermore, because of the low hydrogen pressure in the final stage and because of its enhanced activity due to increased metals content and therefore increased catalytic sites, the activity of the final stage catalyst must be protected in accordance with this invention against excessive aging caused by coke build-up by continuous or periodic injection of a sulfur-containing material such as hydrogen sulfide or hydrogen sulfide-producing hydrocarbon not present in the final stage feed stream to serve as a catalyst sulfiding agent in the final stage to replace loss of sulfur from the catalyst and to maintain high hydrogenation activity in the catalyst in the presence of relatively low hydrogen partial pressures. The particular reason that an extraneous catalyst sulfiding agent is required in the final stage is that the feed to the final stage has too low a sulfur level and the sulfur in the feed is so refractory that insufficient hydrogen sulfide is produced to maintain the catalyst at its start-of-run or presulfided sulfur level. In contrast, in the first stage the feed is so rich in non-refractory sulfur that the hydrogen-sulfide produced in the first stage not only maintains the catalyst at its presulfided fully sulfided level, but being a reaction product it even inhibits the desulfurization rate in the first stage if it is not removed by flashing, as explained below.

In general, the maximum hydrogen partial pressure to be employed in the first catalyst stage should not exceed 2300 to 2500 psi (161.0 to 175.0 Kg/cm$^2$) and preferably should not exceed 1900 to 2,000 psi (133.0 to 140.0 Kg/cm$^2$). If higher hydrogen partial pressures are employed in the first stage an economic waste will result because as the catalyst ages its initial advantage in demetallization activity is lost more rapidly at high hydrogen partial pressures than at lower hydrogen partial pressures so that the highest hydrogen partial pressure to be employed in the first hydrodesulfurization stage can be correlated with the length of the cycle so that maximum total metals removal can be achieved in the first stage considering the entire length of the catalyst cycle. In accordance with the present invention, and in order to achieve commercial utility, the catalyst cycle should be at least 5 and preferably at least 8 and more preferably at least 10 or 12 barrels of feed per pound of catalyst (at least 0.000175 and preferably at least 0.00280 and more preferably at least 0.00350 or 0.00420 m³/g). The catalyst system is balanced so that the high and low pressure hydrodesulfurization stages are capable of about the same cycle life before requiring catalyst regeneration or discard. The quantity and composition of catalyst employed in each stage is established to proviide as long a cycle life as possible with a minimum total quantity of catalyst per barrel of feed, considering the catalyst in each stage. Each stage of the hydrodesulfurization process can provide a cycle life with the available catalyst of at least 4, 5 or 6 months or even at least 11 or 12 months.

The hydrogen pressure in the final stage must be balanced so that on the one hand it is low enough that with increasing catalyst age it tends to maintain or, preferably, to increase the ratio of demetallization to desulfurization which is achieved in the final stage as compared to the first stage and so that it provides an effluent which is essentially free of asphaltenes. At the same time the hydrogen partial pressure in the final stage must be sufficiently high so that there is not an excessive and continual build-up of coke on the catalyst during the run. In the final stage, because of the relatively low hydrogen partial pressure the asphaltene particles tend to remain at a catalyst site for a relatively long period of time before achieving metal or sulfur removal and accepting hydrogen in their place, whereupon the asphaltene particle leaves the catalyst site and frees the site for acceptance of another asphaltene particle to repeat the procedure. Movement of asphaltene particles to and from catalyst sites occurs more rapidly at the higher hydrogen pressure of the initial hydrodesulfurization reactor and proceeds more slowly at the lower pressure of the final hydrodesulfurization reactor. The hydrogen partial pressure in the final hydrodesulfurization reactor should be high enough to at least achieve an equilibrium so that after an initial period of operation the build-up of asphaltene particles upon the catalyst surface stabilizes whereby hydrogenation accompanied by sulfur and metal removal from the asphaltene particle occurs at about the same rate as acceptance of a fresh asphaltene particle at the catalyst site. In the final hydrodesulfurization reactor as asphaltene particle might have to move from one catalyst site to another before it is able to accept hydrogen and become demetallized or desulfurized or the reaction may occur at a single site whereby the asphaltene particle becomes demetallized or desulfurized and accepts hydrogen at only one catalyst site and becomes converted to either a resin, an aromatic or a saturate and leaves the catalyst making the site on the catalyst available for a fresh asphaltene molecule. However, because of the requirement for a slow reaction rate in the final stage, an increased number of catalyst sites are required, and to provide this the weight percentage of active metals in the final stage catalyst is greater than in the initial stage catalyst.

The lowest pressure as well as the optimum pressure for the aforementioned functions in the final catalyst stage of this invention is at least 1300 or 1350 psi (91.0 or 94.5 Kg/cm²) hydrogen partial pressure and preferably 1400 up to 1600 or even 1700, 1800 or 1900 psi (98.0 up to 112.0 or even 119.0, 126.0 or 133.0 Kg/cm²) hydrogen partial pressure. At these pressures, upon catalyst aging an advantageous balance is reached in ratio of weight ppercent demetallization to weight percent desulfurization coupled with a stabilization of asphaltene level on the catalyst surface so that the asphaltene level on the catalyst reaches a plateau at which it is removed and replaced at about the same rate. When this occurs, the effluent from the final stage is essentially free of asphaltenes.

The hydrogen pressures in the initial and final stages can be established in a number of ways. For example, by the hydrogen compressor pressure setting, the amount of diluents in the hydrogen stream and by the amount and locale of recycle hydrogen injection into the system or by the amount and location of fresh hydrogen injection into the system. The hydrogen pressures are preferably balanced so that the length of the catalyst cycle before reaching catalyst deactivation in each of the stages is about the same. Catalyst deactivation occurs when the average temperature in any stage must be raised from a minimum of about 650° or 690°F. (343° or 365°C.) to a maximum of from about 790° or 800°F. (421° or 427°C.) or even 850°F. (454°C.) in order to stabilize at a desired constant level the sulfur content in the effluenet from a reactor. The temperatures are continually or intermittently raised in each reactor during a catalyst cycle to maintain the desired constant sulfur level in the effluent. For example, the temperatures will be adjusted upwardly continually in the reactors so that if a residual feed containing about 4 weight percent sulfur is charged to a three reactor system of this invention, with the reactors in series, the effluent from the first reactor will contain about 1 weight percent sulfur, the effluent from the second reactor will contain about 0.2 to about 0.5 weight percent sulfur and the effluent from the third reactor will contain about 0.05 to 0.1 weight percent sulfur. In addition, the effluent from the third reactor will contain less than 1 and preferably less than 0.6 weight percent nickel equivalent (which is the ppm of nickel plus one-fifth of the ppm of vanadium) when the feed to the first reactor contains 60 ppm of nickel plus vanadium, or more. Also, the effluent from the third reactor will be essentially free of asphaltenes, as measured by conventional means, i.e. no normal pentane insolubles will be detected in a normal pentane extraction of the effluent.

The total catalyst quantity required to achieve the hydrodesulfurization results of this invention will be sharply minimized by employing a higher Group VI and Group VIII metals weight level catalyst in the final stage than is employed in the catalyst in the first stage. The higher the weight percentage of Group VI and Group VIII metal in the final stage catalyst, the higher will be the hydrogenation activity, which will tend to compensate for the lower hydrogen partial pressures occurring in the final hydrodesulfurization stage. Furthermore, it is an important feature of this invention that because the sulfur content in the feed entering the final hydrodesulfurization stage is so low and because this sulfur is so refractory, there is a dearth of sulfur in the atmosphere of the final stage resulting in a loss of sulfur from the presulfided final stage catalyst, tending to cause the final stage catalyst to deactivate more rapidly than the catalyst in any earlier stage. This loss of sulfur can result in a runaway buildup of asphaltenes upon the surface of the catalyst in the final stage due to loss of hydrogenation activity. In order to stabilize and equalize asphaltene adsorption and desorption at the surface of the catalyst in the final stage, it is necessary to provide hydrogen sulfide or other sulfiding agent not present in the oil feed to the catalyst of the final stage so that the cycle life in the final stage is as long as the cycle life in the earlier stages, i.e., each reactor reaches its temperature limitation of about 800°F. (427°C.) at about the same time. We have found that the addition of a sulfiding agent to the final stage can result in a nearly flat aging curve in the final stage. The sulfur addition to the final stage can be received directly by hydrogen sulfide injection, by injection of a hydrogen sulfide producing organic material not present in the feed oil or can be produced from the feed stream in an earlier and higher pressure hydrodesulfurization stage and transmitted to the final low pressure stage by passing the effluent from an earlier higher hydrogen pressure hydrodesulfurization stage containing hydrogen sulfide undiluted by fresh or make-up hydrogen to the final hydrodesulfurization stage without any flashing or hydrogen sulfide absorption step prior to the final hydrodesulfurization stage.

The catalyst in all phases comprises at least one Group VI and at least one Group VIII metal in sulfided condition, such as nickel-cobalt-molybdenum on alumina. Many metals combinations can be employed, such as a cobalt-molybdenum, nickel-tungsten and nickel-molybdenum. A non-cracking alumina support must be employed, such as an alumina containing less than 1 weight percent silica, preferably less than 0.5 weight percent silica and most preferably no more than 0.1 weight percent silica. The metals content on the catalyst is higher in the final stage than in the initial stage. Whatever, metals content is employed, the weight percent of active Group VI-Group VIII hydrogenation metals in the final stage is higher than in the initial stage.

The present invention is directed towards the hydrodesulfurization of a residual oil containing substantially the entire asphaltene fraction of the crude from which it is derived and which therefore contains 95 to 99 weight percent or more of the nickel and vanadium content of the full crude. The nickel, vanadium and sulfur content of the liquid charge can vary over a wide range. For example, nickel and vanadium can comprise 0.005 to 0.05 weight percent (5 to 500 parts per million) or more of the feed oil while sulfur can compise about 2 to 6 weight percent or more of the charge oil.

In the hydrodesulfurization process of this invention it is the partial pressure of hydrogen rather than total reactor pressure which determines hydrodesulfurization and demetallization activity. Therefore, the hydrogen stream should be as free of other gases as possible.

The gas circulation rate can be between about 2000 and 20,000 standard cubic feet per barrel (between about 36.0 and 360.0 SCM/100L), generally, or preferably about 3000 to 10,000 standard cubic feet per barrel of gas (54.0 to 180.0 SCM/100L), and preferably contains 80 percent or more of hydrogen. The mol ratio of hydrogen to oil can be between 8:1 and 80:1. Reactor temperatures can range between about 650° and 900°F. (343° and 482°C.), generally, and between about 680 and 800°F. (360° and 427°C.), preferably. The temperature should be low enough so that not more than about 10, 15 or 20 percent of a 650°F. + (343°C.+) residual oil charge will be cracked to furnace oil or lighter. At reactor outlet temperatures of 800 to 850°F. (427 to 454°C.) the steel of the reactor walls rapidly loses strength and unless reactor wall thicknesses of 7 to 10 inches (17.78 to 25.40 cm) or more are utilized, a reactor outlet temperature of about 800° to 850°F. (427° to 454°C.) constitutes a metallurgical limitation. The liquid hourly space velocity in each reactor of this invention based on hydrocarbon oil feed to the first stage can be between about 0.2 and 10, generally, between about 0.3 and 3, preferably, or between about 0.5 and 1.5, most preferably.

The catalyst employed in the process, as stated above, comprises sulfided Group VI and Group VIII metals on a support, such as sulfided nickel-cobalt-molybdenum or cobalt-molybdenum on alumina. Hydrodesulfurization catalyst compositions suitable for use in the present invention are described in U.S. Pat. No. 2,880,171 and also in U.S. Pat. No. 3,383,301. However, an advantageous feature of the catalyst particles of the present invention is that the smallest diameter of these particles is broadly between about one-twentieth and one-fortieth or one-fiftieth inch (0.127 and 0.0635 or 0.051 cm), preferentially between one twenty-fifth and one thirty-sixth inch (0.102 and 0.071 cm), and most preferably between about one twenty-ninth and one thirty-fourth inch (0.081 and 0.075 cm). Particle sizes below the range of this invention would induce a pressure drop which is too great to make them practical. The catalyst can be prepared so that nearly all or at least about 92 or 96 percent of the particles are within this size range. The catalyst can be in any suitable configuration in which the smallest particle diameter is within this size range, such as roughly cubical, needle-shaped or round granules, spheres, cylindrically shaped extrudates, etc. By smallest particle diameter is meant the smallest surface to surface dimension through the center or axis of the catalyst particle, regardless of the shape of the particle. The cylindrical extrudate form having a length between about one-tenth and one-fourth inch (0.254 and 0.635 cm) is highly suitable.

It is important in this invention that the catalyst is essentially free of dehydrogenation activity to prevent formation of severely hydrogen deficient coke on the catalyst. It is to be emphasized that the hydrocarbon build-up in the final stage catalyst is not a severely hydrogen-deprived material initially but is essentially an asphaltene or coke precursor material as received in the feed stream containing somewhat higher than the feed hydrogen to carbon ratio. Because the catalyst has not rendered the feed asphaltene hydrogen deficient, the asphaltene is capable of undergoing desulfurization and demetallization accompanied by a reception of hydrogen to convert the feed asphaltene to a more hydrogen-rich molecule such as a resin, an aromatic, or a saturate, which can then leave the catalyst site by dissolving into the main flow stream in the final reactor, thereby stabilizing the asphaltene content on the catalyst. An indication that the catalyst support of the present invention is not a hydrocracking or coke forming (i.e. a hydrogen depriving) catalyst is illustrated by the fact that increasing hydrogen pressures with the catalyst does not result in any detectable or significant increased hydrogen consumption. Furthermore, after brief conditioning of the catalyst under the same conditions of temperature, pressure and residence time, the amount of hydrocracking experienced with the catalyst of the present invention is about the same as that experienced with inert solid particles.

The various stages in series of the hydrodesulfurization process of the present invention are balanced with respect to hydrogen partial pressure, relative catalyst volume and catalyst activity in order to encourage balancing of relative metals removal in each of the stages. For example, in a three-stage operation, the quantity of asphaltenes and metals will be greatest in the first stage, intermediate in the second and smallest in the third stage. To compensate for this, the percent reduction of asphaltenes and metals in the first stage will be the lowest, will be intermediate in the second stage and will be the highest in the third stage. As an example, consider a residual feed to the hydrodesulfurization process of this invention containing about 10 weight percent asphaltenes, about 5 percent will be thermally cracked or rendered into smaller structures by the enhanced solubility in aromatics at the high hydrogen pressure of the first stage. The remaining 5 percent will be more refractory to hydrocracking than most of those in the feed. Since the first stage possesses the highest hydrogen partial pressure, whatever asphaltenes are refractory to hydrocracking in the first stage will not be thermally cracked at as great a rate in the subsequent stages since the subsequent stages are at a lower pressure. If they were not amenable to cracking at the higher pressure of the first stage they will be less amenable to hydrocracking at the lower pressures of the subsequent stages. Of the 5 percent of the asphaltenes fed to the first stage which is refractory to hydrocracking, about 2 percent will be adsorbed on the first stage catalyst whereat it will be demetallized and/or desulfurized. This amounts to a 40 percent reduction in asphaltenes in the first stage by adsorption on the catalyst. The remaining 3 percent of asphaltenes in the feed enter the second hydrodesulfurization stage, and in the second stage, of this 3 percent, 2 percent will be adsorbed on the second stage catalyst where it will be desulfurized and/or demetallized, amounting to a 67 percent reduction of asphaltenes by adsorption on the catalyst in the second stage. This leaves 1 percent of the total asphaltenes in the feed for entry into the third catalytic stage. In the third catalytic stage essentially the entire 1 percent is adsorbed on the catalyst and is demetallized and/or desulfurized for subsequent dissolution into the hydrodesulfurization product stream as a resin, aromatic or saturate molecule, so that the effluent stream of the third stage is essentially free of asphaltenes. Assuming that reduction in asphaltenes in the above example generally corresponds to absorption of metals on the surface of the catalyst, there is a progressive increase from 40 percent reduction of metals in the first stage to 67 percent reduction in metals in the second stage to essentially 100 percent reduction of metals in the third stage. However, while the percent reduction in metals is increasing in each stage, the absolute quantity of metals removed is progressively diminished in the stages so that there tends to be a balance of absolute quantity of metals removal in the various reactors of the system. However, it is emphasized that there is a progressively smaller absolute amount of metals removal in each subsequent stage. This balance is important because while asphaltene particles reach an equilibrium so that they accumulate and are removed at about the same rate on the catalyst surface, the metals that build-up can not be removed by ordinary means during the process and they therefore contribute toward irreversible limitation of the catalyst cycle in each reactor.

Data are shown below which illustrate not only the optimum and the minimum hydrogen pressure to be employed in the final hydrodesulfurization stage (the optimum is about 1400 psi [98.0 Kg/cm$^2$] hydrogen partial pressure) but also the optimum and maximum hydrogen partial pressure to be employed in the initial hydrodesulfurization stage. These data show that at very high pressures (2300 psi [161.0 Kg/cm$^2$] hydrogen partial pressure) the asphaltene content of the catalyst was reduced but the sulfur content of the remaining asphaltenes changed very little. This indicates that the higher pressure performed a catalytic effect in hydrocracking the asphaltenes to lighter molecules without appreciable removal of metal or sulfur which require relatively extended adsorption time at a catalyst site for their occurrence. Evidently at the higher hydrogen pressure of 2300 psi [161.0 Kg/cm$^2$] even the briefest contact with a catalyst site resulted in very rapid reaction thereupon the molecule became hydrogenated to a less refractory asphaltene or a nonasphaltene or became hydrocracked to smaller fragments before enough time elapsed at the catalyst site to permit removal of sulfur or metals. The same tests show that at the lower hydrogen partial pressure of 1950 psi (136.5 Kg/cm$^2$) there was essentially no change in the asphaltene content in the feed oil although the sulfur content in the asphaltenes was diminished sharply. These data indicate that at the lower pressure the asphaltenes adsorbed on the catalyst site were permitted sufficient residence time for removal of metals and sulfur although the pressure was not sufficiently high to accomplish much hydrogenation to less refractory nonasphaltenic material and/or hydrocracking. These tests indicate that at a pressure as high as 2300 psi (161.0 Kg/cm$^2$) desulfurization of asphaltenes does not occur to as significant an extent as at low hydrogen partial pressures. These tests were taken with an aged catalyst in the first reactor.

In FCC operations the sulfur concentration is highest in the higher boiling product fractions of the FCC product. It is an important advantage of this invention that the sulfur content of the hydrodesulfurization effluent is so low that even the fuel oil range (400° to 650°F. [204° to 343°C]) product of FCC has a sulfur content below 0.25 weight percent, preferably below 0.20 weight percent, which meets commercial specifications for home heating oil in the United States, so that further desulfurization of the fuel oil is not required. This is unusual since usually furnace oil range product from FCC operations must be desulfurized to meet home heating oil sulfur commercial specification. Therefore, the hydrodesulfurization-FCC combination process of this invention accomplishes all required desulfurization requirements in advance of the FCC step with no desulfurization operation required after the FCC operation. A further and important advantage of this fact is that, because the sulfur is removed from the feed in advance of FCC, rather than following FCC, the sulfur dioxide in the FCC regenerator off-gas which comes from sulfur-containing coke on the zeolite catalyst, is minimized to a level meeting commercial requirements without scrubbing of sulfur dioxide from the regenerator flue gas. It is extremely difficult to scrub sulfur dioxide in a flue gas stream and high sulfur dioxide levels in FCC regenerators are rapidly becomming an unacceptable source of air pollution. In accordance with this invention this difficulty is obviated.

Figure 8:
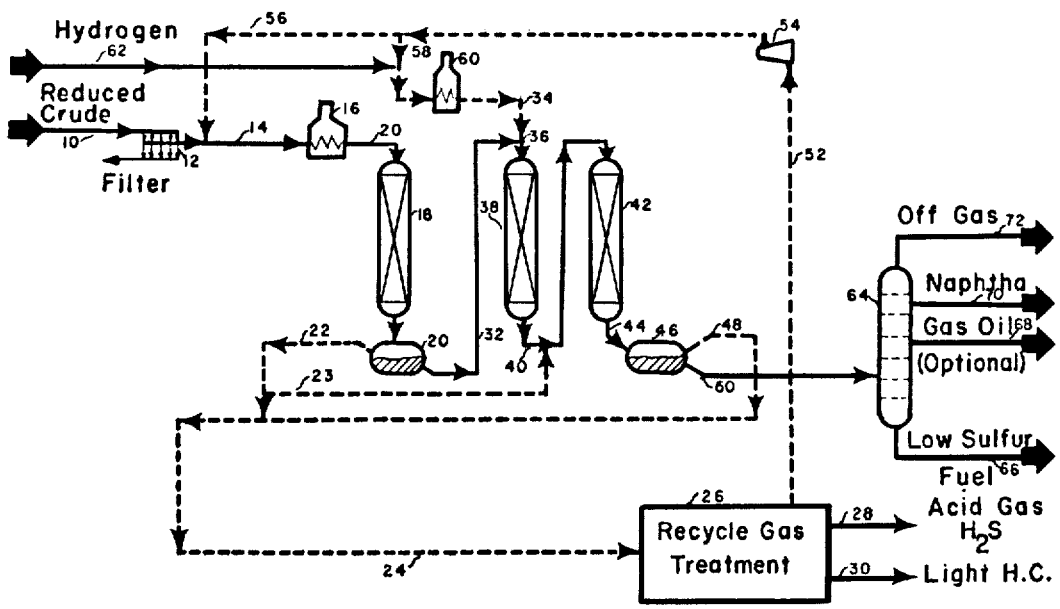
Figure 9:
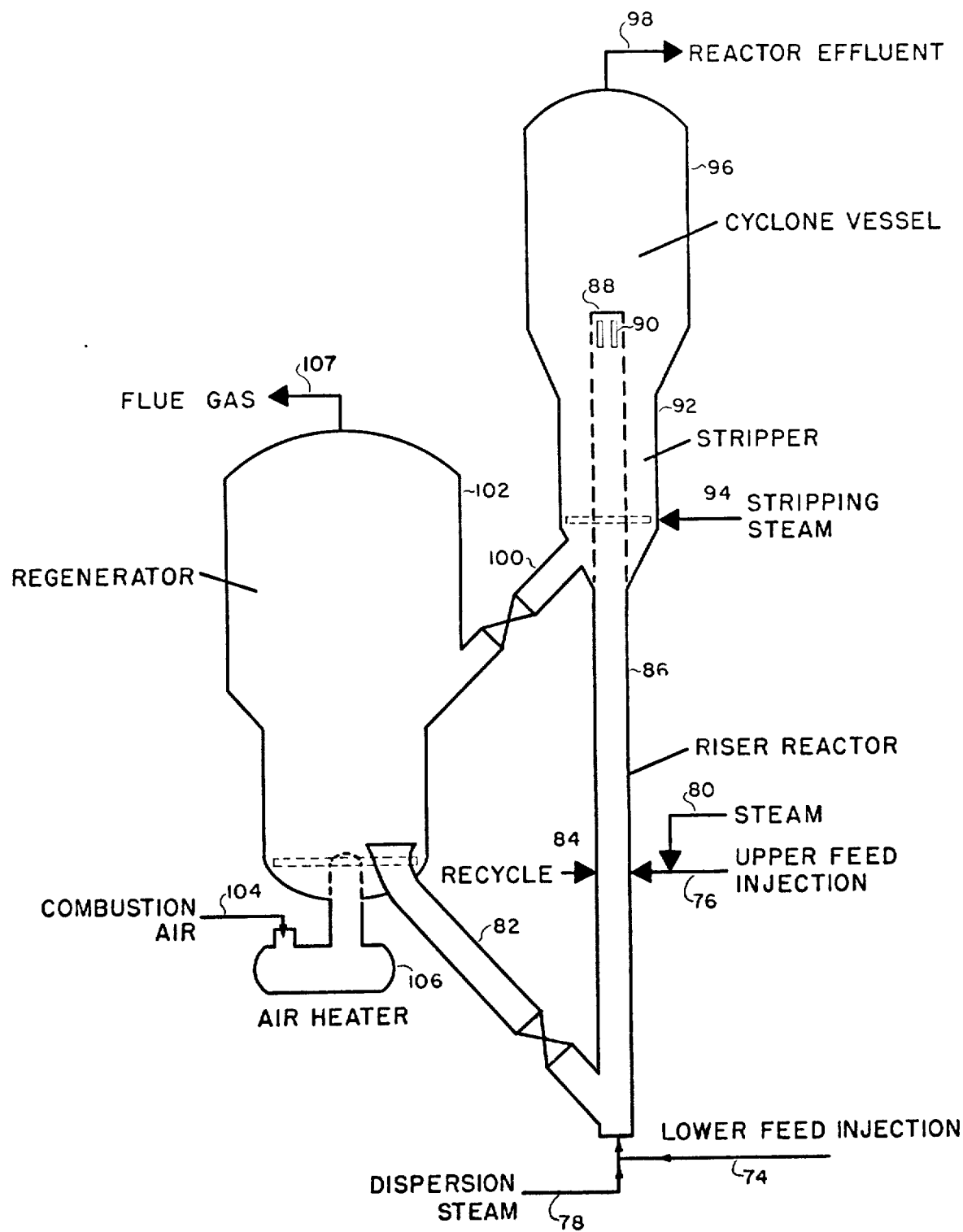

FIGS. 1–7 and 10–13 present data to illustrate the invention, while FIGS. 8 and 9 show apparatus for performing the invention.

Figure 2:
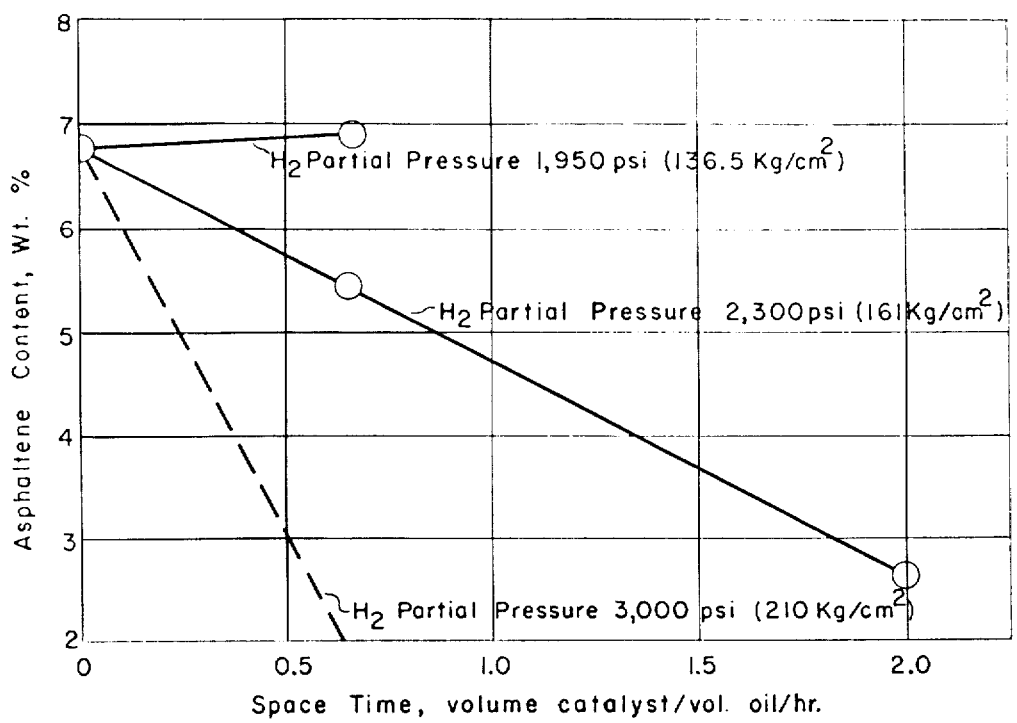
Figure 3:
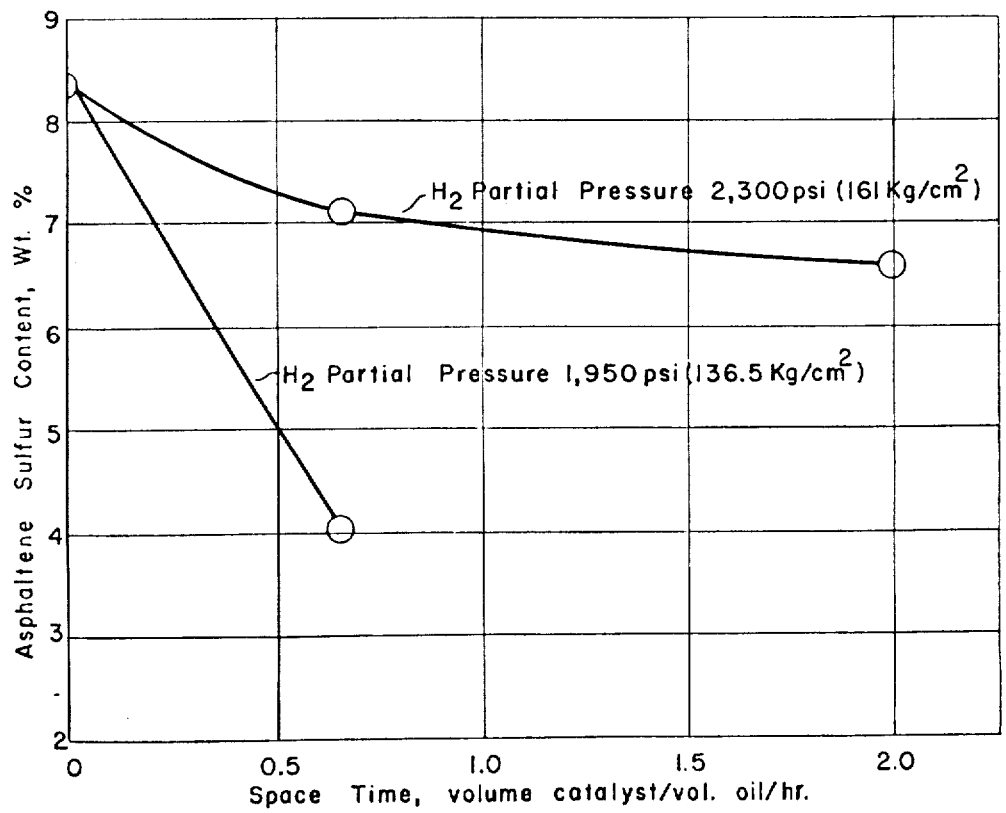

The characteristics of the hydrodesulfurization process discussed above are illustrated in the data shown in the attached figures. FIG. 1 shows the effect of hydrogen partial pressure upon the ratio of weight percent demetallization, using demetallization at 1400 psi (98.0 Kg/cm$^2$) hydrogen partial pressure as a base, of a residual oil employing a fresh (unaged) relatively low active metals level hydrogenation catalyst of the first hydrodesulfurization reaction stage of this invention. As shown in FIG. 1, data taken with an unaged low metals catalyst show that an increase of hydrogen partial pressure results in an increase in demetallization. Since most of the metals present in the feed are present in the asphaltene fraction of the feed, an increase in demetallization represents a decrease in asphaltene content of the stream passing through the reactor. FIG. 1 tends to indicate that a residual oil hydrodesulfurization process wherein it is desired to produce a product having a very low metals level, such as a hydrodesulfurization process to convert a high metals-containing residual oil to a good quality FCC feed stream which will not unduly deactivate the FCC zeolite catalyst by excessive metals deposit thereon, requires as high a hydrogen partial pressure as possible. However, FIGS. 2 and 3 illustrate the discovery of the present invention indicating that the data of FIG. 1 are misleading and that as the catalyst ages if it is desired to convert a residual oil via hydrodesulfurization in a prolonged catalyst aging cycle to a product having a relatively low sulfur and metals content, while employing a relatively small quantity of hydrodesulfurization catalyst, it is not desirable to operate the total hydrodesulfurization process uniformly at a high pressure but rather it is more advantageous to operate the hydrodesulfurization system employing both a high pressure phase and a low pressure phase. The pressures in the stages should be selected to provide an economic optimum quantity of catalyst in the stages based on the length of the catalyst cycle desired.

FIGS. 2 and 3 illustrate residual oil hydrodesulfurization data with a relatively low hydrogenation metals catalyst of the first hydrodesulfurization stage of this invention under high pressure conditions including a run at 2300 psi (161.0 Kg/cm$^2$) hydrogen partial pressure and a lower pressure run at 1950 psi (136.5 Kg/cm$^2$) hydrogen partial pressure. FIG. 2 shows that at the higher hydrogen partial pressure of 2300 psi (161.0 Kg/cm$^2$), asphaltene content diminishes at a relatively rapid rate whereas at 1,950 psi (136.5 Kg/cm$^2$) hydrogen partial pressure there is substantially no change in asphaltene content. The runs of FIGS. 2 and 3 were made with a catalyst that had been aged and not with the fresh catalyst. FIG. 3 represents the same tests as shown in FIG. 2 but illustrate what appears to be an opposite result. The data of FIG. 3 show that at the higher hydrogen partial pressure of 2300 psi (161.0 Kg/cm$^2$) there occurs very little reduction in sulfur content in the asphaltene fraction of the stream while at the lower pressure of 1950 psi (136.5 Kg/cm$^2$) there is a much greater reduction in sulfur content in the asphaltene fraction.

The dashed line in FIG. 2 indicates that at a much higher hydrogen partial pressure of 3000 psi (210.0 Kg/cm$^2$), asphaltenes could be completely removed in a single reactor at a space time of about 1, completely removing the problem of asphaltene sulfur content in the oil in one stage. However, at such a high pressure the reactor thickness and operating costs would be excessive and impractical. It is the purpose of the present invention to employ a lower pressure mode of operation to completely remove asphaltenes in a plurality of stages, and more particularly to arrange the stages to utilize a plurality of hydrogen pressures, whereby reactor thickness and catalyst costs are not excessive. When employing a plurality of pressures, it is important to completely remove asphaltenes at as low a first stage pressure as possible, since the second phase pressure must be a step-down from the first and an excessive pressure step-down would be wasteful.

Although the solid line data of FIGS. 2 and 3 appear to be contradictory, they illustrate the underlying discovery of the present invention and show the unexpected nature of this discovery. Referring to FIG. 2, at the 2300 psi (161.0 Kg/cm$^2$) hydrogen partial pressure the asphaltene content diminishes rapidly as compared to the 1950 psi (136.5 Kg/cm$^2$) pressure test because at the 2300 psi (161.0 Kg/cm$^2$) pressure, it is pressure rather than residence time at a catalyst site that appears to be controlling. An asphaltene particle present at a catalyst site at the relatively high hydrogen partial pressure of 2300 psi (161.0 Kg/cm$^2$) reacts very readily so that at a very short residence time at the catalyst site the asphaltene particle is able to chemically accept some hydrogen to increase its hydrogen to carbon ratio and either be converted to a less refractory resin and/or become hydrocracked to a lower-boiling saturate or aromatic compound. At the 1950 psi (136.5 Kg/cm$^2$) test condition, the pressure is not high enough to accomplish much hydrocracking and therefore an asphaltene molecule reacting at the catalyst site at the 1950 psi (136.5 Kg/cm$^2$) pressure does not undergo hydrocracking but remains an asphaltene. FIG. 3 shows that at the 1950 psi (136.5 Kg/cm$^2$) hydrogen partial pressure test condition the lack of extensive hydrocracking permitted the asphaltene molecule to remain at the catalyst site sufficiently long to become more extensively desulfurized, specifically because it was not first hydrogenated or hydrocracked and thereby enabled to readily leave the catalyst site. Therefore, at the lower pressure the catalytic effect tends to become controlling in preference to the asphaltene adsorption effect caused by the change in pressure. Therefore, the longer residence time at the 1950 psi (136.5 Kg/cm$^2$) pressure does not diminish the asphaltene content in the stream but it does substantially reduce the sulfur level in the feed asphaltenes, which feed asphaltenes tend to remain as asphaltenes. On the other hand, as shown in FIG. 3, at the 2,300 psi (161.0 Kg/cm$^2$) pressure, the hydrogen pressure effect tends to become controlling over the catalytic effect, causing the residence time at the catalyst site to be so brief the sulfur content of the asphaltenes that remained in the stream was diminished very little. This shows that a longer residence time at the catalyst site is required to accomplish desulfurization of asphaltenes (desulfurization being a highly catalytic effect) than is required to merely asphaltenes, add hydrogen to the asphaltene molecules and thereby to hydrocrack asphaltene molecules and the longer residence time is accomplished by reducing hydrogen pressure. In this manner, the rate of hydrogenolysis of the asphaltenes is no greater than or is less than the rate of desulfurization, thereby allowing the controlling reaction to be a desulfurization of those asphaltenes which do not readily react to become smaller compounds.

An important feature of the showing of FIGS. 2 and 3 is that the hydrocracking and/or hydrogenation (i.e. hydrogenolysis) that occurred at the 2,300 psi (161.0 Kg/cm$^2$) hydrogen partial pressure, while it diminished asphaltene content in the flowing stream, merely produced products containing only a slightly reduced quantity of sulfur and metals in the asphaltenes. On the other hand, the test made at the 1950 psi (136.5 Kg/cm$^2$) hydrogen partial pressure, while it did not reduce asphaltene content in the flowing stream, did succeed in sharply reducing sulfur (and also metals) content in the asphaltene flowing stream. FIGS. 2 and 3 therefore show that if effective desulfurization and demetallization is to occur in the asphaltene fraction, it is important that the hydrogen partial pressure in the first stage of the hydrodesulfurization process of the present invention need not be too high, resulting in lower costs for equipment. The data indicate that much greater sulfur removal from the asphaltenes is accomplished at 1950 psi (136.5 Kg/cm$^2$) than is accomplished at 2,300 psi (161.0 Kg/cm$^2$). Therefore, the hydrogen partial pressure in the first stage of the present invention with the relatively low Group VI-Group VIII metals content catalyst of this invention should be less than 2300 psi (161.0 Kg/cm$^2$) and preferably less than 2100 or 1900 psi (147.0 or 133.0 Kg/cm$^2$) hydrogen partial pressure. The hydrogen partial pressure to be employed will generally be dependent upon feed properties.

Figure 4:
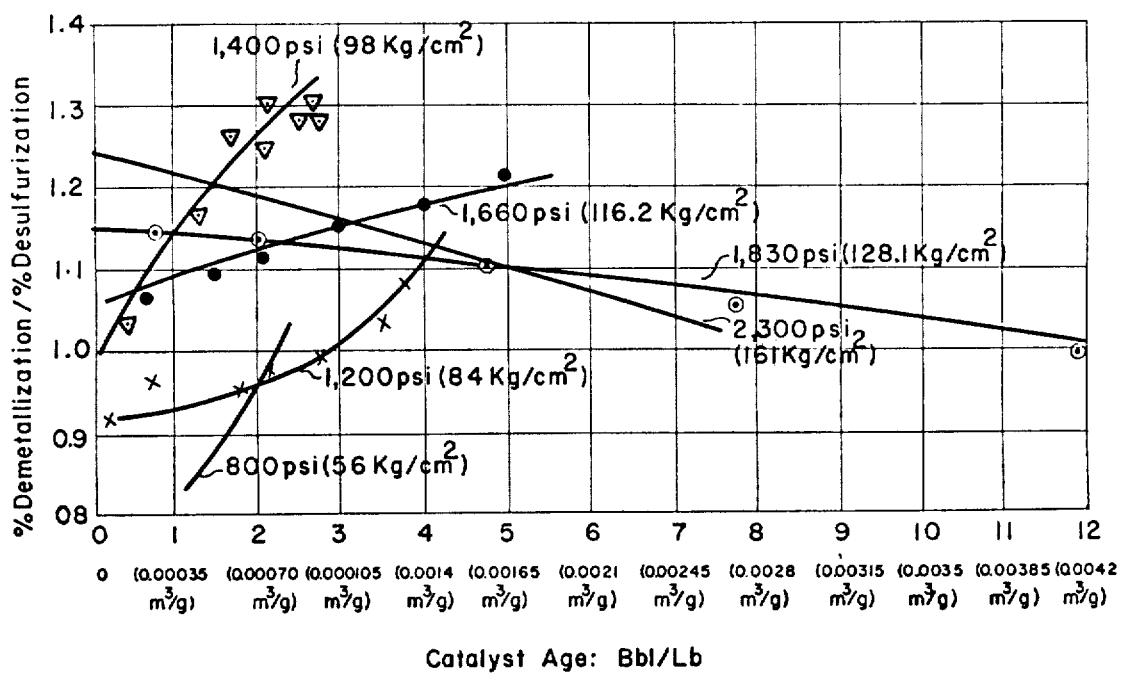

FIG. 4 illustrates another unexpected discovery related to the effect of hydrogen partial pressure upon catalyst aging. The data shown in FIG. 4 also illustrate a catalyst aging effect opposite to the effect shown in the data of FIG. 1. FIG. 4 shows the results of pilot plant aging tests conducted in the initial reactor of applicants' hydrodesulfurization process with a 50 percent reduced Kuwait crude residual feed employing an alumina-supported hydrodesulfurization catalyst having the relatively low Group VI-Group VIII metals content of this invention. The data of FIG. 4 show the effect of aging on the ratio of percent demetallization to percent desulfurization at various hydrogen partial pressures. FIG. 4 shows that at zero catalyst age the higher the hydrogen partial pressure the higher is the ratio of percent demetallization to percent desulfurization. This is in conformity with the showing of the data in FIG. 1, which was made with a fresh catalyst. However, the unexpected showing of FIG. 4 is that with increasing age the exact opposite effect occurs. That is, with increasing catalyst age, high hydrogen partial pressures cause the ratio of percent demetallization to percent desulfurization to become progressively lower. FIG. 4 shows that although the data curve for a 2300 psi (161.0 Kg/cm$^2$) hydrogen partial pressure test initially exhibits the highest ratio of all the tests, the decline in selectivity for metals over sulfur removal with increasing age is the steepest at this high pressure. FIG. 4 shows that although the data for the 1830 psi (128.1 Kg/cm$^2$) test initially has a lower ratio of demetallization to desulfurization, at this pressure there is a loss in demetallization selectivity at a lower rate, so that after an age of about 5 barrels of feed per pound of catalyst (0.00175 m$^3$/g), this test pressure surpasses the 2300 psi (161.0 Kg/cm$^2$) test in demetallization to desulfurization ratio. The test made at 1660 psi (116.2 Kg/cm$^2$) hydrogen partial pressure had a still lower initial demetallization selectivity, but with aging the demetallization activity actually tends to increase so that after only about a catalyst age of 2 barrels per pound (0.00070 m$^3$/g) the demetallization to desulfurization ratio for the 1660 psi (116.2 Kg/cm$^2$) test is higher than the ratio for the 1830 psi (128.1 Kg/cm$^2$) test. It is noteworthy that the tests made at the relatively high pressures of 2300 psi (161.0 Kg/cm$^2$) and 1830 psi (128.1 Kg/cm$^2$) both have negative slopes indicating a decline in demetallization selectivity with catalyst aging in an extended aging test. The test made at 1660 psi (116.2 Kg/cm$^2$) hydrogen partial pressure is the highest pressure test made which exhibits a positive slope, i.e. which shows an actual increase in ratio of weight percent demetallization to weight percent desulfurization with increasing catalyst age. At progressively lower hydrogen partial pressures between 800 psi (56.0 Kg/cm$^2$) and 1660 psi (116.2 Kg/cm$^2$) the ratio curve becomes increasingly steep with catalyst aging. At a pressure generally between 1700 and 1800 psi (119.0 and 126.0 Kg/cm$^2$), the selectivity aging curve changes in slope from negative to positive. It is noted that these values are representative of a particular feedstock and catalyst. It also is noted that the tests of all the curves of FIG. 4 were made at temperatures which were continually or intermittently increased so that a 4 weight percent sulfur feed stream was converted to about a 1 weight percent sulfur effluent, except that the effluent sulfur in the 1200 psi (84.0 Kg/cm$^2$) test was 1.12 weight percent and in the 800 psi (56.0 Kg/cm$^2$) test the effluent sulfur was 1.5 weight percent due to the fact that it was almost impossible to raise temperatures fast enough to compensate for declining catalyst activity. The 1660 psi (116.2 Kg/cm$^2$) test is the only test shown in FIG. 4 which was conducted at a constant temperature (775°F. [413°C.]) so that as the test progressed the sulfur content in the effluent was permitted to increase from 1.0 weight percent to 1.9 weight percent.

Referring again to FIG. 4, the test at 1400 psi (98.0 Kg/cm$^2$) shows the highest ratio of percent demetallization to percent desulfurization of all the tests made. The test made at 1400 psi (98.0 Kg/cm$^2$) achieves this high ratio because of two factors. First, its initial activity at this pressure is not so exceedingly low that it cannot be overcome by a positive aging slope. Secondly, the aging slope is sufficiently steep so that, combined with the relatively high initial catalyst activity, the 1400 psi (98.0 Kg/cm$^2$) pressure achieves high demetallization rates very early in the run. For example, the demetallization ratio in the 1400 psi (98.0 Kg/cm$^2$) run exceeds the demetallization ratio for the 1830 psi (128.1 Kg/cm$^2$) run at a catalyst age of only 1 barrel per pound (0.00035 m$^3$/g). After this catalyst age, the 1400 psi (98.0 Kg/cm$^2$) run far exceeds the 1830 psi (128.1 Kg/cm$^2$) run in demetallization activity. The data in FIG. 4 show that the initial activity for the tests made at 800 and 1200 psi (56.0 and 84.0 Kg/cm$^2$) were so low that in spite of the steepness of the slope of the demetallization curves upon aging at these two pressures, an excessively great time duration elapsed before an appreciably high demetallization ratio was achieved. According to the data shown in FIG. 4, the final phase reactor is best operated at a pressure of about 1400 psi (98.0 Kg/cm$^2$) of hydrogen and generally between 1300 psi (91.0 Kg/cm$^2$) and 1,600 psi (112.0 Kg/cm$^2$) or 1700 psi (119.0 Kg/cm$^2$) of hydrogen. An optimum pressure range would be about between 1300 psi (91.0 Kg/cm$^2$) or 1,350 psi (94.5 Kg/cm$^2$) and 1,500 psi (105.0 Kg/cm$^2$) hydrogen pressure. Best results are obtained when the first and final stage hydrogen pressures pass the threshold values wherein the percent demetallization/percent desulfurization v. catalyst age is slightly negative in the first stage whereas this same slope is positive in the final stage.

FIG. 4 shows runs conducted at a sufficiently low pressure that the controlling feature in the reactor is the absorption and residence time of asphaltene at a catalyst site or sites. At these low hydrogen pressures, significant hydrocracking or hydrogenation activity does not occur and therefore an asphaltene molecule contacting a catalyst site tends to reside at the site or to move to another catalyst site for a significant total catalyst residence time before reaction can occur. Due to the lenghtened on-catalyst residence time at low hydrogen partial pressures, the reaction that occurs is not apt to be hydrocracking or simple hydrogenation but is more apt to be removal of metals and sulfur accompanied by an acceptance of hydrogen to provide a loss of metal and sulfur from the asphaltene molecule. At the low pressures, such as 1400 psi (98.0 Kg/cm$^2$) the residence time required is sufficiently great that a significant build-up of asphaltene molecule occurs upon the surface of the catalyst. The asphaltene content on the catalyst may reach about 20 to 40 percent by weight of catalyst, as compared with a coke level on the catalyst in the first or high pressure hydrodesulfurization stage of only about 5–15 weight percent. However, at the low pressure stage and with the high level of hydrogenation metals on the low pressure catalyst, the asphaltenes do not tend to dehydrogenate and form what is known as carbon or coke of very low hydrogen content. Instead, they tend to remain as asphaltenes and to reside at the catalyst site while they slowly desulfurize and demetallize. Upon reacting by loss of sulfur and/or metal, they then may leave the catalyst and may be replaced by a fresh asphaltene particle. In the molecules leaving the catalyst, the void left by the removed metal or sulfur is replaced by hydrogen so that the ratio of hydrogen to carbon in the molecule is increased and the treated molecule is no longer an asphaltene. In this manner, a substantial equilibrium level of asphaltenes is rapidly achieved on the surface of the catalyst. Although the residence time required for reaction is low due to the relatively low hydrogen partial pressure, the hydrogen pressure is selected in relation to the Group VI-Group VIII metals level on the catalyst so that an equilibrium level of asphaltenes on the catalyst is achieved. At the equilibrium level or plateau there is no significant increase or decrease in asphaltenes content on the surface of the catalyst and a significantly long aging run can be achieved so that the total catalyst age before deactivation, that is, before the catalyst reaches a temperature of 790° or 800°F. (421° or 427°C.), or above, depending upon reactor metallurgy, to achieve the desired effluent metals and sulfur level is as great or is balanced in the final reactor as compared to length of the run in the initial or high pressure reactor.

It is noted that the very high percentage metals removal level is only useful in the final reactor where the total asphaltene and metals concentration in the stream is already low and not in the initial reactor where the total asphaltene and metals level is high where very high percentage removal of metals would result in excessively rapid catalyst aging. Therefore, in the balanced hydrodesulfurization system of this invention, the life of the catalyst in the initial stage is metals-limited while the life of the catalyst in the final stage is coke-limited, with the life cycles being essentially balanced.

FIG. 4 shows that in a lengthy commercial operation of at least 10 or 12 barrels of feed oil per pound of catalyst (0.00350 or 0.00420 m$^3$/g), the only runs that achieved a weight ratio of demetallization to desulfurization of greater than 1 at both start-of-run and end-of-run were the 1400, 1660 and 1830 psi (98.0, 116.2 and 128.1 Kg/cm$^2$) runs. A ratio greater than 1 indicates the reactor is primarily an asphaltene removal reactor since most metals are concentrated in the asphaltenes. Since the third stage is capable of maintaining percent demetallization to percent desulfurization ratios greater than 1, and can produce an asphaltene-free effluent throughout the cycle of 10 - 12 barrels per pound (0.00350 – 0.00420 m$^3$/g), a considerable savings in catalyst cost is realized by employing a relatively lower Group VI-Group VIII metal catalyst in the first or first and second stages since a high proportion of catalyst cost is based on the Group VI- Group VIII metals content thereon. Depending on the space velocities employed, FIG. 4 shows catalyst life cycles of 4, 5, 6 or even 11 or 12, or more, months is possible before regeneration or discarding of the catalyst.

Figure 5:
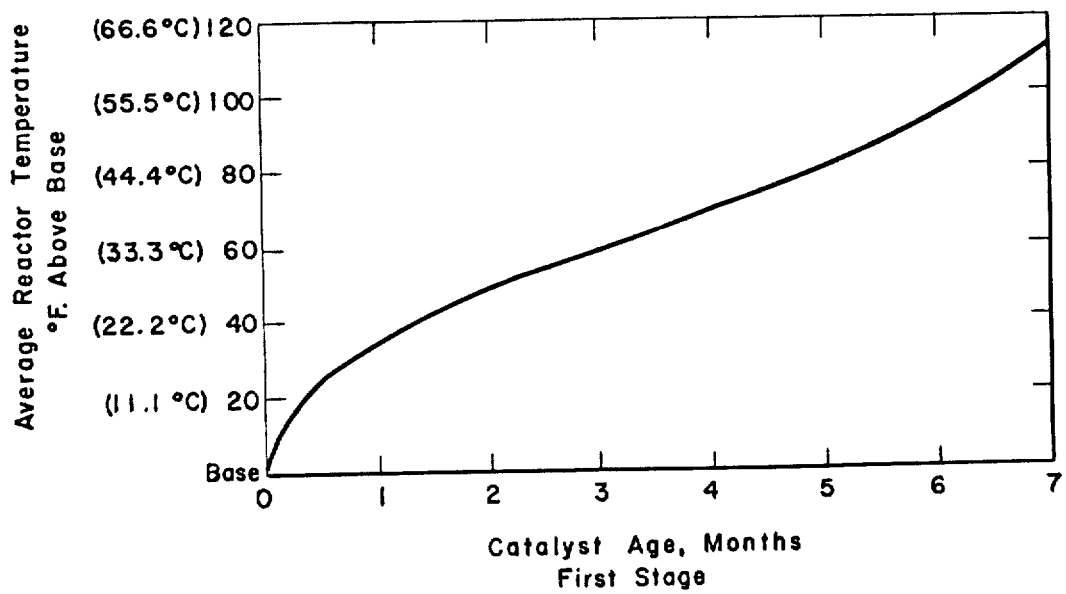

FIG. 5 shows a typical aging run in a first stage reactor of this invention in terms of catalyst age versus increase in reaction temperature to reduce a 650°F.+ (343°C.+) residue from about 4 weight percent sulfur to about 1 weight percent sulfur at about 1830 psi (128.1 Kg/cm$^2$) partial pressure of hydrogen with a relatively low hydrogenation metals content catalyst of the present invention.

Figure 6:
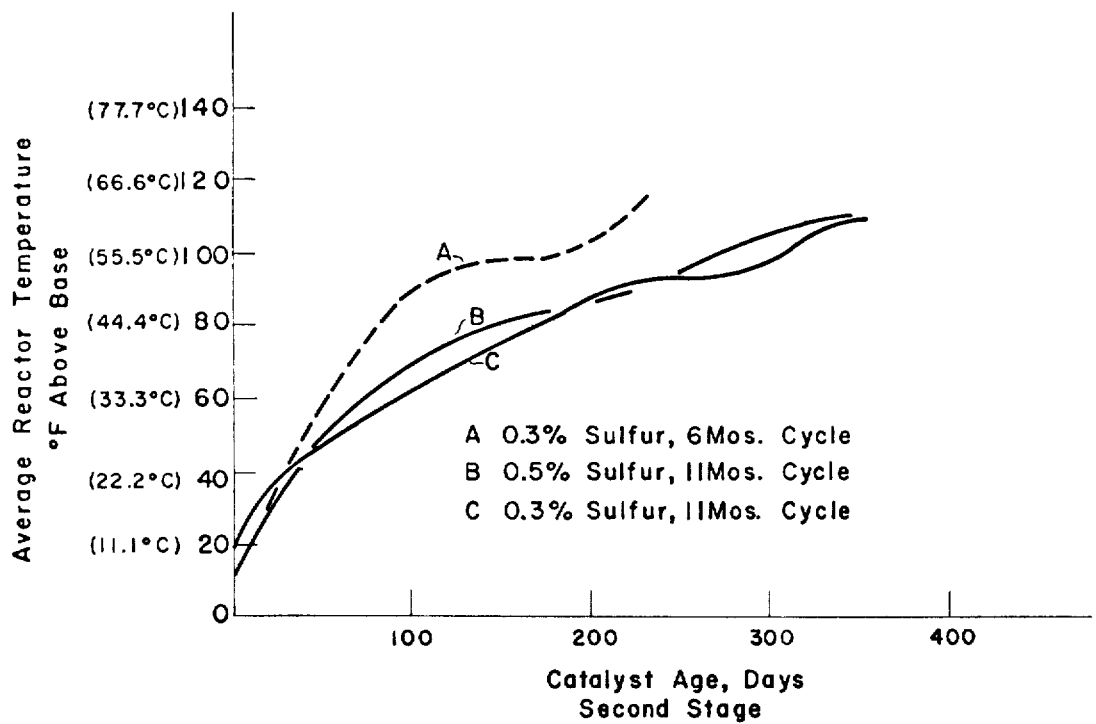

FIG. 6 shows similar aging runs at various space velocities (as reflected by cycle lengths) wherein the effluent from the test of FIG. 5, after being flashed to remove hydrogen sulfide and light hydrocarbons, and after receiving fresh hydrogen to be repressurized to about nearly the same hydrogen pressure as the hydrogen pressure in the first reactor, and employing a similar low hydrogenation metals catalyst as employed in the first reactor, is further treated in a second reactor to reduce the sulfur content from about 1 weight percent down to either 0.3 or 0.5 weight percent sulfur.

Figure 7:
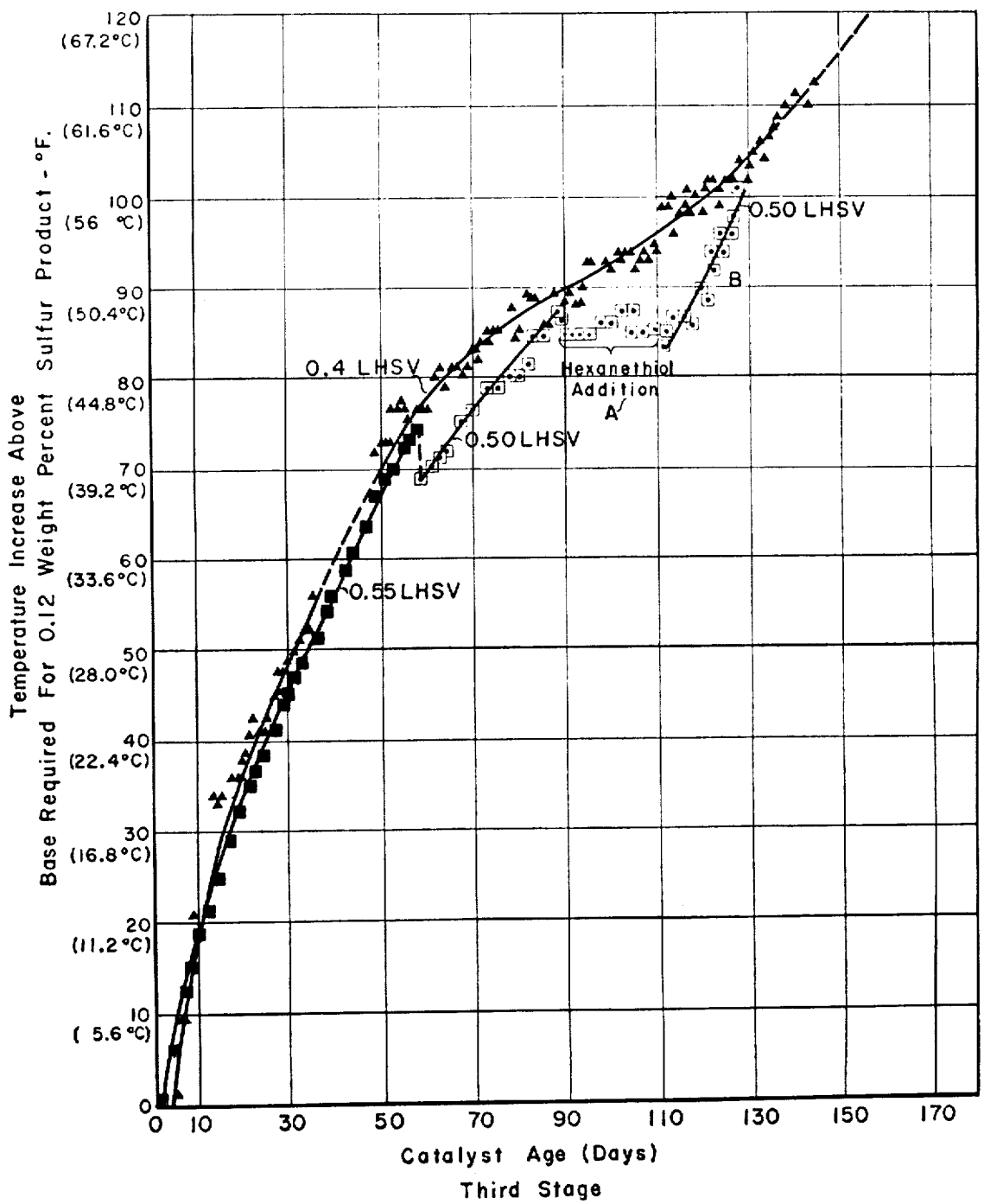

FIG. 7 shows the results of aging runs made in the third and final hydrodesulfurization reactor of this invention. A comparison of FIG. 7 with FIGS. 5 and 6 shows that the aging rate of the third reactor (FIG. 7) is much more rapid than the aging rate in the earlier reactors and the catalyst in the third reactor cannot last the full cycle reached in the earlier reactors unless special steps are taken in the third reactor, as described, which are not required in the first two reactors. The third reactor was operated at 1,700 psi (119.0 Kg/cm$^2$) hydrogen partial pressure and contained a catalyst having a higher Group VI-Group VIII metals content than the catalyst of the first two reactors. It is emphasized that the feed to the final reactor, after having its sulfur content reduced to 0.3 - 0.5 weight percent, has remaining in it the most refractory sulfur and also the most refractory metals present in the feed oil. This remaining sulfur and metals content is probably most refractory because, for example, it is the feed sulfur and metals content which is the most deeply embedded within the interior of the feed asphaltene or resin molecules. By the time the stream reaches the final stage, most of the sulfur and metals content of the total stream is present in the remaining asphaltenes. Most of the less refractory sulfur and metals, i.e. the metals closest to the fringe of the asphaltene molecule, are more readily removed and are extracted in the first two stages. Because the sulfur and metals content in the stream entering the final stage contains the most refractory metals and sulfur, the asphaltenes in the stream require the longest residence time at a catalyst site. They also require a catalyst which is enhanced in hydrogenation activity as compared to the catalyst used to remove less refractory sulfur and metals. While the reaction in the initial stage tends to be hydrogen pressure limited, the reaction in the final stage tends to be catalyst contact-time limited and low hydrogen pressure in the final stage tends to encourage lengthy contact time of the most refractory species, such as asphaltenes, at a catalyst site, just as high hydrogen pressure in an initial stage tends to inhibit asphaltene residence time at a catalyst site. Furthermore, because the sulfur level in the feed in the final stage is so low, even the removal of said sulfur as hydrogen sulfide is insufficient to maintain sufficient sulfur in the atmosphere to permit the catalyst in the final stage to be maintained in a fully or start-of-run sulfided condition, as required to prevent its rapid deactivation. Therefore, there is no flashing step between the second and third stages of the present invention and the hydrogen sulfide produced in the second stage is passed to the third stage and is used as a source of sulfur for maintaining the third stage catalyst in a highly sulfided condition, as is required for maintaining its activity.

The lack of hydrogen sulfide in the third reactor causes the catalyst to lose sulfur so as to maintain an equilibrium, with respect to hydrogen sulfide, between the catalyst, the liquid and the gas phases. If the catalyst is to be maintained in an adequately sulfided state, it is necessary for the reaction stream to contain a sufficient quantity of hydrogen sulfide by maintaining a hydrogen sulfide atmosphere in the gases in contact with reaction stream. If there is insufficient hydrogen sulfide gas in contact with reaction stream, the feed liquid will drain sulfur from the catalyst. But if there is sufficient gaseous hydrogen sulfide present, the liquid will not tend to reduce the sulfur level of the catalyst. Therefore, it is important that sufficient hydrogen sulfide be added to the third stage to keep the catalyst in the third stage adequately sulfided and this can only be accomplished if there is sufficient hydrogen sulfide partial pressure above the liquid which in turn will maintain the active catalytic metals in a fully sulfided state.

The test of FIG. 7 illustrates the importance of external addition of sulfur to the final stage catalyst, whether this sulfur comes from the previous stage, is injected as hydrogen sulfide or is injected as an extraneous organic sulfur-containing precursor compound which is easily convertible to hydrogen sulfide. The data illustrated by the triangle data points in FIG. 7 were taken to simulate the final stage of the hydrodesulfurization process of this invention except that no hydrogen sulfide from any source was added with the feed. As shown, the aging slope was steep throughout the run. However, the data in FIG. 7 illustrated by the square shaped points show a feed also devoid of hydrogen sulfide from any source until the region A, denoted by hexanethiol addition, was reached. The aging curve was just as steep until reaching region A. At region A, the sulfur containing compound hexanethiol was added with the feed in order to contribute sulfur for sulfiding of the catalyst. As shown in FIG. 7, when the hexanethiol was added the aging rate become stabilized and the curve became relatively flat, indicating essentially no further catalyst aging during the sulfiding of the catalyst. After the hexanethiol addition was terminated, at the end of the flat region A, the aging rate again increased, indicated by the region of the curve B, illustrating the criticality in the final stage of the present invention of maintaining the high Group VI-Group VIII metals-content catalyst in a sulfided condition. The addition of sulfur from a source other than the sulfur-refractory feed stream to sulfide the final stage catalyst during the run is shown to be particularly important in the final stage. Of course, the addition of hydrogen sulfide is not harmful from the point of view of reducing the hydrogen partial pressure because, as explained above, the final stage of the hydrodesulfurization process of this invention operates most advantageously at low hydrogen partial pressures. Tests were made in which the substitution of other hydrogen sulfide precursors, such as butanethiol, thiophene and ethanethiol were also found to provide a flat aging rate in the third stage.

The dearth of hydrogen sulfide is not noticed early in a test but depends upon the length of the test and the amount of catalyst present. A lack of hydrogen sulfide in the third reactor atmosphere results in initial desulfurization of the top of the third stage catalyst bed coupled with a covering of catalyst sites with hydrogen-deficient hydrocarbons, shifting the reaction burden to progressively deeper regions of the bed which are not yet desulfided. It is only when the desulfurization of the catalyst and covering of the catalyst sites with hydrogen deficient hydrocarbons reaches sufficiently deeply into the catalyst bed leaving insufficient fully sulfided and non-coated catalyst remaining, that the lack of hydrogen sulfide becomes apparent. Therefore, the lack of hydrogen sulfide is not immediately apparent in the third stage at start-of-run. Also, after a desulfided catalyst is resulfided onstream during a run by extraneous hydrogen sulfide addition, termination of hydrogen sulfide addition does not show a deleterious effect upon aging rate until the desulfiding and catalyst coating procedure has again progressed sufficiently deeply into the bed that insufficient fully sulfided and uncoated catalyst remains.

FIG. 8 schematically illustrates a preferred three-stage hydrodesulfurization process of this invention. As shown in FIG. 8, a reduced crude such as a 650°F.+ (343°C.+) Kuwait reduced crude from an atmospheric tower bottoms is charged through line 10 through a filter 12 wherein salts and solids are removed. The feed then passes into line 14 and is heated in furnace 16 from which it passes to the first high pressure reactor 18 through line 20. The catalyst in the first stage stabilizes at a coke level of about 14 weight percent throughout substantially an entire 6 month test. The effluent from reactor 18 is flashed to remove hydrogen sulfide and light hydrocarbons in flash chamber 20. These light materials pass through line 22 to line 24 and into a recycle gas treatment apparatus 26 from which hydrogen sulfide is recovered through line 28 and light hydrocarbons are recovered through line 30. Purified hydrogen is then available for recycle through line 52.

The flashed liquid from reactor 18 containing about 1 percent sulfur is passed through line 32 and admixed with purified hydrogen entering through line 34. The repressurized stream in line 36 enters the second reactor 38. Reactors 18 and 38 have the same type of low Group VI-Group VIII metals catalyst. The effluent from the second reactor 38 in line 40 contains about 0.5 - 0.3 weight percent sulfur and contains all the hydrogen sulfide produced in reactor 38. It enters the third reactor 42 through line 40 without being flashed for removal of hydrogen sulfide, whereby the hydrogen partial pressure in reactor 42 is lower than the hydrogen partial pressure in reactors 18 and 38. Furthermore, line 40 introduces a pressure drop between reactors 38 and 42 to further lower the hydrogen pressure in reactor 42 and so that, in terms of pressure drop, reactor 42 is not equivalent to merely an elongated combination reactor 38-42. Fresh hydrogen is not added to the charge to reactor 42 in order to maintain a low hydrogen partial pressure in reactor 42. Reactor 42 contains a catalyst comprising a higher proportion of Group VI and Group VIII metals than the catalyst of the first two reactors and operates at a lower pressure than does the first two reactors. If additional hydrogen sulfide is required to maintain catalyst activity in reactor 42, it can be supplied from an extraneous source, not shown, or can be a slip-stream of hydrogen sulfide-containing low hydrogen partial pressure gases from the first reactor which is charged to third reactor feed line 40 through line 23.

The coke level on the third stage catalyst stabilizes at about 20-40 weight percent based on original catalyst throughout substantially an entire six month test but contains only about 0.5 weight percent of metals from the feed at the end of a six month test. Unless extraneous sulfur is added, the NiS catalyst can be reduced to $Ni_2S$ while the $MoS_2$ can be reduced to $Mo_2S_3$. The feed to the third reactor may contain a finite amount from less than about 1 to as high as 3 weight percent asphaltenes, which is reduced to about zero percent, and clearly below 0.1 weight percent asphaltenes in the third reactor depending upon the feed to the process. The product being asphalt-free constitutes a lubricating oil feedstock in a suitable boiling range without a solvent deasphalting step required. The asphaltenes have an affinity for the catalyst sites and therefore move through the third stage at a lower space velocity than the lighter saturates and aromatics, which do not require as much desulfurization or demetallization, which lighter materials tend to be less attracted to the catalyst sites, moving through the third stage at a much higher space velocity than the asphaltenes.

The effluent from reactor 42 passes through line 44 into flash chamber 46 from which light gases are removed through line 48 and from which liquid is removed through line 50. The light gases in line 48 are admixed with the light gases in line 22 and pass to the recycle gas treatment chamber 26. Recycle hydrogen is recovered from chamber 26 through line 52 and is repressurized in compressor 54 for recycle to the feed stream through line 56 for feeding to the first reactor 18 or through line 58 for charging to the second reactor 38 through heater 60. Make-up hydrogen is added through line 62. Product liquid from flash chamber 46 is passed through line 50 to a fractionator 64 from which low sulfur, low metals, fuel oil suitable for feeding to an FCC cracking unit is removed as bottoms through line 66. If desired a separate gas oil fuel can be removed through line 68. A small amount of naphtha, if produced, is removed through line 70 and off-gas is removed through line 72. The process converts less than 20 percent, preferably less than 10 percent and most preferably less than 5 or even less than 2 percent of the feed in line 10 to material boiling in the naphtha range or below.

The middle stage 38 of the three hydrodesulfurization stages of the present invention is pivotal to improved operation in the first stage 18 and to improved operation in the third stage 42. Since the middle stage 38 is a relatively high pressure stage and employs the same catalyst as the first stage 18, it provides a combination relatively high pressure process with the first stage 18, wherein less catalyst is required for a given amount of sulfur removal in high pressure stages 18 and 42, than if the same amount of sulfur were removed in a single stage without intermediate flashing. This advantageous effect is the subject of Ser. No. 206,083, filed Dec. 8, 1971, now U.S. Pat. No. 3,775,305, which is hereby incorporated by reference. It is shown below that the cooperative effect between reactor 38 and the final reactor 42 causes reactor 42 to reduce catalyst consumption also. The intermediate flashing step between stages 1 and 2 provides the advantages necessary to high pressure operation, i.e. removing hydrogen sulfide reaction product and increasing hydrogen partial pressure by removal of hydrogen sulfide and light hydrocarbon gases produced in the first stage. In this manner a higher average hydrogen partial pressure in the first two stages is realized with consequent greater sulfur removal occurring in stages 18 and 38 than would occur in a single stage with the same total quantity of catalyst or in two stages without intermediate flashing with the same total quantity of catalyst. The middle or second stage 38 also cooperates with the final and relatively low pressure stage 42 utilizing the more highly active hydrogenation catalyst by providing hydrogen sulfide required in the low pressure stage by virtue of the facts that there is no flashing step between the second and third stages, there is no high pressure purified hydrogen injection between the second and third stages and the line 40 between the second and third stages introduces a pressure drop between the stages. In this manner, the second stage provides hydrogen sulfide to the third stage and thereby helps to keep the third stage catalyst in an active, sulfided state, and also helps to reduce the hydrogen partial pressure in the gases entering the third stage in order to advantageously lower the hydrogen pressure in the third stage.

The third stage catalyst is more preferential to metal removal than sulfur removal as compared to the first stage catalyst. For example, the first stage catalyst removes 75 weight percent of both feed sulfur and feed metals while the third stage catalyst removes 73 weight percent of its feed sulfur but 89 weight percent of its feed metals.

The low sulfur material in line 66 of FIG. 8 is charged to the FCC system shown in FIG. 9 through line 74 and possibly also line 76 of FIG. 9. The total feed to the riser is preferably the hydrodesulfurized residual oil but distillate can also be added to the riser, if desired. Dispersion steam is added to the FCC riser through lines 78 and 80. Hot regenerated zeolite catalyst is added through line 82 while recycle oil is added through line 84. All catalyst fed to the riser is fed to the riser inlet to provide as high a flash equilibrium vaporization temperature as possible at the reactor inlet to vaporize the maximum possible quantity of residue to prevent coke formation due to non-vaporization of high boiling feed oil. There is essentially no increase of catalyst to oil ratio along the reaction flow stream in the riser and there is essentially no slippage of catalyst relative to hydrocarbon along the reaction flow path. The entire mixture passes upwardly through riser cracker 86 which is capped at 88 and the mixture discharges from the riser through lateral slots 90 into a stripper chamber 92. The residence time in the riser is less than 5 seconds, preferably less than 2 or 3 seconds. Stripping steam is added through line 94 to remove hydrocarbons from deactivated catalyst and cracked effluent passes through a separation chamber 96 containing cyclones, not shown, wherein solids are removed from product and the cracked product is removed through line 98. Deactivated catalyst passes through line 100 to regenerator 102 wherein it is regenerated by burning with combustion gas such as air which enters through line 104 and heater 106. Flue gas from the regenerator is discharged through line 107.

It is a particular advantage that all desulfurization in the combination hydrodesulfurization-FCC system covered by this invention can occur in advance of the FCC unit because this permits the amount of sulfur dioxide formed by the burning of sulfur-containing coke in regenerator 102 passing through flue gas effluent line 107 to be sufficiently low to meet commercial specifications. Sulfur dioxide from a catalytic cracking regenerator can be a considerable source of atmospheric pollution and when feed sulfur is pre-removed from a cracking feedstock, as contrasted from removal of sulfur from cracking effluent, the combination process contributes to holding the sulfur dioxide content in the regenerator flue gas to a low level.

Figure 10:
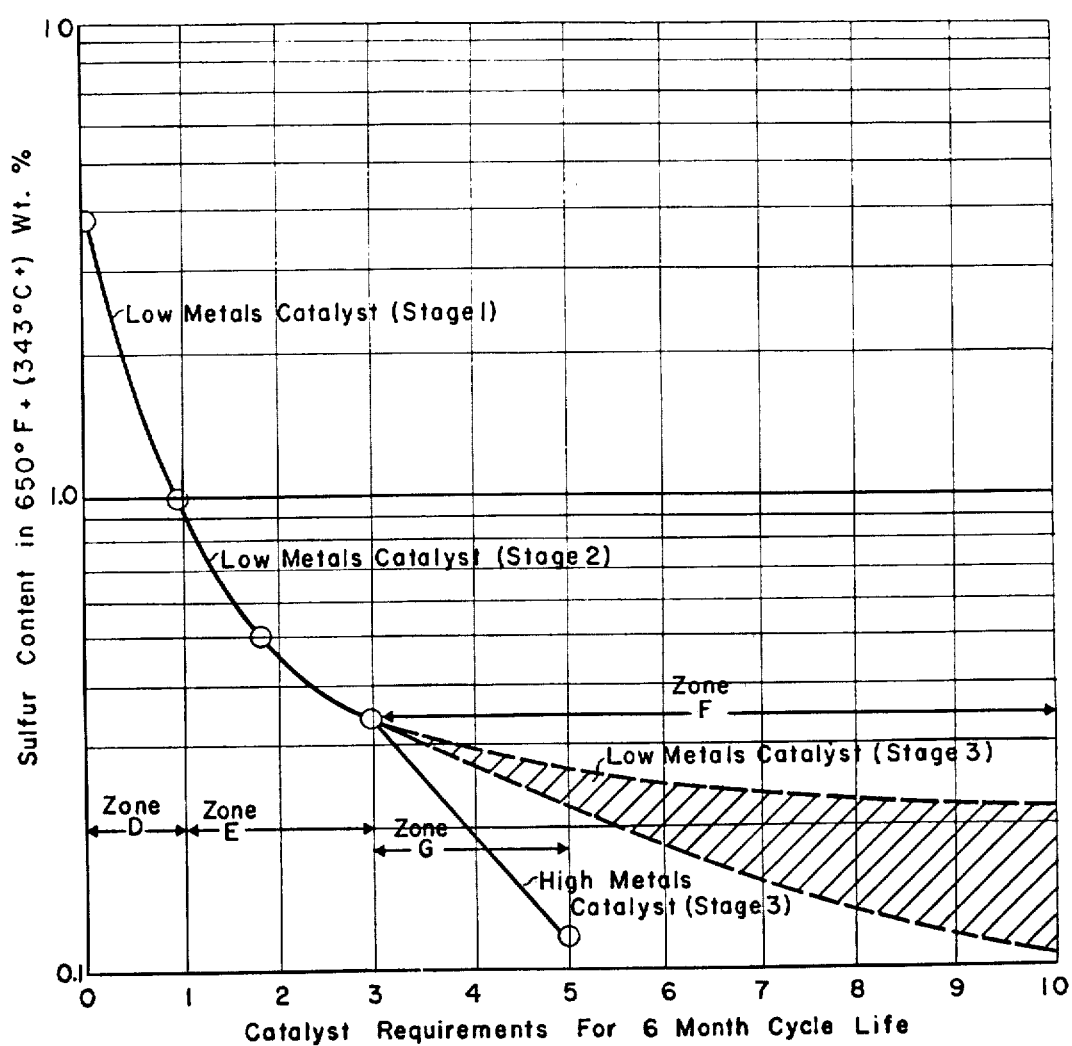

FIG. 10 illustrates the savings in hydrodesulfurization catalyst (especially in active metals content on the catalyst) made possible by employing higher and lower active metal-content catalysts in the hydrodesulfurization system in a process which converts a residual oil containing 4 weight percent sulfur to a feed stream suitable for charging to an FCC unit containing about 0.1 weight percent sulfur and which is free of asphaltenes. As shown in FIG. 10, zone D shows the relative amount of low metals catalyst required in the first reactor to reduce the sulfur content of the feed from 4 to 1 weight percent. It is emphasized that the catalyst in the first reactor is unusual in that it intentionally is of a lower activity (i.e. lower active metals content) than the catalyst in the final stage. Zone E in FIG. 10 shows that about twice as much of the same catalyst is required to reduce the sulfur content further from about 1.0 to about 0.3 weight percent sulfur with the same type of low metals catalyst at about the same hydrogen partial pressure. The greater quantity of catalyst is required in the second reactor wherein the quantity of sulfur is reduced from 1.0 to 0.3 weight percent because the least refractory sulfur is removed in the first reactor and the remaining sulfur entering the subsequent reactors is increasingly refractory. Zone F shows the amount of catalyst which would be required to further reduce the sulfur level from 0.3 to 0.1 weight percent if the same type of low metals catalyst was retained in the third reaction zone as was employed in the first and second reaction zone because of the increasingly refractory nature of the remaining sulfur. Zone F shows that, on the scale used, if the same type of catalyst were employed in three zones the total quantity of required catalyst would be relatively about 10 to remove the sulfur to the level indicated by the shaded area. However, zone G shows the sulfur removal characteristics by utilizing a higher Group VI-Group VIII metals-content catalyst in the third zone at a lower pressure and with hydrogen sulfide addition. By employing a different catalyst in the third zone as described, the total amount of catalyst employed in the three zones to accomplish the same result in the scale used in a balanced system with the catalyst in each reactor having about a six month cycle life is about 5. Therefore, FIG. 10 shows that only about half as much catalyst is required by employing the two types of catalyst in the present invention as described than would be required if only one type of catalyst were employed in all three zones.

The fact that the addition of hydrogen sulfide (which is the reaction product) to a hydrodesulfurization reactor was found to be beneficial in a hydrodesulfurization reaction is unexpected in view of the published literature in this regard. For example, the AIChE Journal, Vol. 18, No. 2, page 310, March, 1973, specifically states that even hydrogen sulfide formed during hydrodesulfurization is detrimental to the hydrodesulfurization reaction. In Hydrocarbon Processing, May, 1973, page 95, in FIG. 4 data are presented in graph form relating to residue hydrodesulfurization which show best results are obtained when the gas phase has zero mole percent hydrogen sulfide and as the hydrogen sulfide increases from zero mole percent a steep fall-off in reaction rate occurs. Clearly, the discovered importance of adding hydrogen sulfide to the third stage of the present process is a direct contrast to these literature references.

Figure 11:
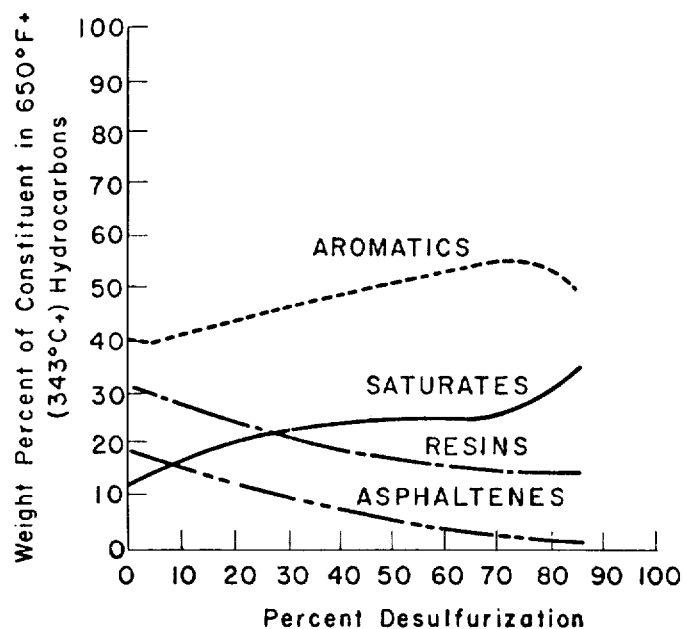

The inability of a single catalyst type of operation to get rid of all asphaltenes is illustrated in FIG. 11. FIG. 11 shows that asphaltenes content tends to level off at a low value with the low metals catalyst and high pressure of the initial stages of the process of this invention and that no matter how deep the level of overall desulfurization proceeds, a residual asphaltene level remains which becomes increasingly difficult to remove. FIG. 11 shows the criticality of the final low pressure stage of this invention employing a different catalyst if asphaltenes are to be removed. FIG. 11 shows that if reaction conditions and catalyst are not changed, valuable hydrogen is wasted by needlessly saturating aromatics due to high hydrogen pressures. Defining the terms of FIG. 11, resins and asphaltenes are the residue of a n-propane extraction but of this residue, resins are soluble in n-pentane while asphaltenes are insoluble.

An important feature of this invention is regulation of the amount of Group VI-Group VIII metals, especially molybdenum, in the fresh catalyst of each stage because of the effect in that stage of Group VI-Group VIII metals content upon both the demetallization and desulfurization of the residual feed oil. As the metals level goes up in the fresh catalyst, the start-of-run rate of feed desulfurization and feed demetallization is increased, regardless of which stage is involved. However, the catalyst age is limited by the total metals loading that the catalyst can bear, which is 40–50 weight percent of the total catalyst and also by the desired product sulfur level. Total metals loading includes both deposited metals from the feed, especially nickel and vanadium, plus the Group VI-Group VIII active hydrogenation metals initially on the catalyst. Therefore, the first stage catalyst of this invention would be as high in demetallization and desulfurization activity as the third stage catalyst if its Group VI-Group VIII metal content were as high. But because the first stage catalyst treats a high metals feed, the quantity of removal of metals from the feed with a high Group VI-Group VIII metals-content catalyst would rapidly bring the catalyst to its maximum metals loading capacity, because as stated, maximum metals loading for a catalyst of this invention is about 40 to 50 weight percent of deposited nickel plus vanadium plus the original Group VI-Group VIII active metals on the catalyst. As the quantity of Group VI-Group VIII active metals on the original catalyst increases, the relative amount of nickel and vanadium per unit weight of catalyst support that can be deposited becomes lower. As the maximum metals loading on the catalyst (40 to 50 weight percent) is approached, the activity of the catalyst tends towards zero. In downflow operation, maximum or saturation metals loading occurs first at the top of the catalyst bed and then progresses downwardly into the bed with increasing catalyst age, leaving progressively less active catalyst available. Therefore, there must be a balance in Group VI-Group VIII metals content between start-of-run activity and attainable catalyst age at full metals loading. This balance must be established so that the catalyst in the various stages of this invention experience about the same total cycle life, i.e. the reactor temperature in each stage should reach about 800°F. (427°C.) at about the same time to prevent waste of non-deactivated catalyst in any stage when another stage is completely deactivated, since a turn-around of the entire system occurs when 800°F. (427°C.) is reached in any single reactor.

While ultimate deactivation of the initial stage catalyst is primarily due to full-metals loading, ultimate deactivation of the final stage catalyst is primarily due to coke formation, although each type of deactivation occurs to some extend in each stage. Therefore, to assist desorption of coke it is necessary for the final stage catalyst to have a relatively higher Group VI-Group VIII metals content on the fresh catalyst, especially molybdenum. The final stage catalyst can safely employ high Group VI and Group VIII metals because its age (in barrels of feed/pound of catalyst or in months onstream) at deactivation is not limited by metals deposition from the feed since the feed reaching it has already been largely demetallized, but rather by coke formation due to the reduced pressure in the final reactor. In order for the final stage to completely remove asphaltenes (as determined by n-pentane extraction), it is important to largely avoid conversion of the asphaltenes deposited on the catalyst to coke of reduced hydrogen to carbon ratio, which dehydrogenated material is difficult to remove from the catalyst by hydrogenation to resins or other materials. To largely avoid such dehydrogenation of asphaltenes it is important to have a high metals content on the final stage catalyst, thereby permitting the final stage operation to proceed at low temperatures for as large a portion of the catalyst cycle as possible.

If the first stage catalyst contains 30 weight percent of Group VI-Group VIII metals it can accept not more than an amount of metals which will increase its weight percent of metals to 50. On the other hand, if the first stage catalyst contains 20 weight percent of Group VI-Group VIII metals, although its initial activity would be lower, it can endure for a longer aging period because it can accept a larger amount of metals from the feed before its weight percent of metals reaches 50. It is seen that because the level of metals in the feed to the final stage is greatly diminished, the final stage catalyst can take advantage of a higher molybdenum-content that can the first stage catalyst. Although not as important as molybdenum, the amount of cobalt, especially, and to a lesser extent, nickel, generally increase and decrease to maintain an advantageous ratio of these metals to molybdenum. However, as stated, in each reactor stage molybdenum is the fundamental metal entity on the catalyst for purposes of hydrogenation activity.

Following are recommended ranges for active hydrogenation catalyst metals content on the catalyst of first, second and third hydrodesulfurization stages of this invention.

| Metal | Weight Percent as Metal on Fresh Catalyst |
|---|---|
| Catalyst of Stage 1 — Hydrogenation Metal: | |
| Molybdenum | 3 – 16 |
| Cobalt | 0.3 – 6 |
| Nickel | 0.2 – 2 |
| Catalyst of Stage 2 | |
| Molybdenum | 4 – 18 |
| Cobalt | 0.5 – 7 |
| Nickel | 0.3 – 3 |
| Catalyst of Stage 3 | |
| Molybdenum | 6 – 26 |
| Cobalt | 0.7 – 9 |
| Nickel | 0.4 – 4 |

Although the ranges of each metal on the catalyst for each stage overlap, it is important that the amount of hydrogenation metal in the final stage be greater than the amount in the first stage, especially molybdenum. Cobalt generally changes proportionally with the amount of molybdenum, as does nickel, although cobalt is a more important component on the catalyst than is nickel. The second stage may or may not be present in a hydrodesulfurization system of this invention. If the second stage is present, it may have an intermediate quantity on the catalyst of molybdenum, and probably also of cobalt and nickel, as compared to the catalysts of the first and third stages. However, the second stage may employ the same catalyst as that employed in the first stage or it may employ the same catalyst as that employed in the third stage. The type of catalyst employed in the second stage will depend on the metals and sulfur content of the feed. The important criterion is that a relatively lower active metals content catalyst is employed in any stage if deactivation of the catalyst with increasing catalyst age in that stage is limited by feed metals deposition upon the catalyst, such as in the initial stage, while a relatively higher metals content catalyst is employed in any stage if catalyst deactivation upon aging is controlled by the amount of coke deposition from the feed, rather than metals deposition. The metals content in the second stage will therefore depend upon the extent to which is deactivation is a metals deactivation or a coke deactivation.

Figure 13:
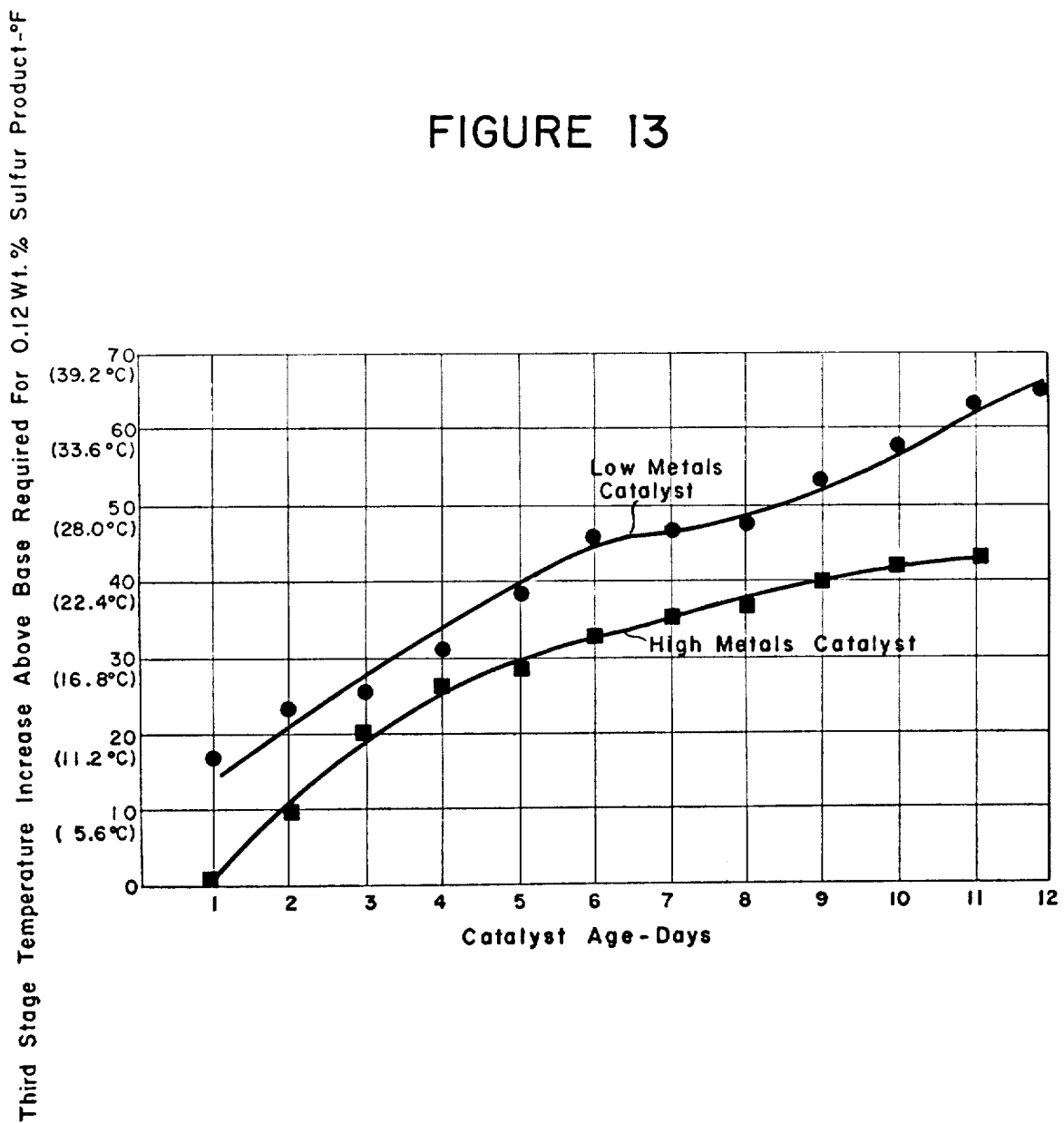

FIG. 13 illustrates the results of a test conducted in the third hydrodesulfurization stage showing the importance of a relatively high metals content catalyst in the third stage. The test was conducted by charging the effluent from a second stage containing a catalyst of a relatively lower metals content than the third stage catalyst, which effluent contained 0.52 weight percent sulfur. The conditions in the third stage were 1,890 psi (132.3 Kg/cm$^2$) total pressure, 5000 SCF/B (90.0 SCM/100L) of a gas containing 90 percent hydrogen and 0.7 percent hydrogen sulfide and a space velocity of 0.4 LHSV. The catalyst employed in the upper curve of FIG. 13 comprised 2.25 weight percent nickel, 1.25 weight percent cobalt and 11 weight percent molybdenum. The catalyst of the lower curve of FIG. 13 comprised 1.5 weight percent nickel, 4.0 weight percent cobalt and 16.0 weight percent molybdenum. Both catalysts were in the form of a one-sixteenth inch (0.156 cm) extrudate and supported on alumina.

FIG. 13 shows that the required temperature increase above a base temperature in the third stage throughout the period of the aging test shown to produce a third stage effluent containing 0.12 weight percent sulfur were significantly higher with a catalyst containing a lower molybdenum and a lower cobalt plus nickel content. It is shown in FIG. 13 that results in the third stage were greatly improved when the third stage catalyst contains more than 5.5 weight percent Group VIII metal and more than 16 weight percent of Group VI metal on alumina, as compared to a third stage catalyst containing a lower proportion of these metals. The data illustrated in FIG. 13 indicate that utilization of a high metals catalyst in the third stage can be translated into a great savings in total catalyst volume in the third stage.

The effluent of the third hydrodesulfurization stage of this invention based on a 650°F.+ (343°C.+) residuum feed to the first stage has the boiling range and sulfur characteristics shown in Table 1.

TABLE 1

| TBP of Effluent Fraction (°F.) | Percent Sulfur in Fraction | Percent of Total Sulfur | Volume Percent of Total Yield |
|---|---|---|---|
| IBP-375 (191°C.) | 0.04 | 0.38 | 1.62 |
| 375-650 (191-343°C.) | 0.04 | 3.50 | 13.71 |
| 650-1065 (343-571°C.) | 0.09 | 40.84 | 68.11 |
| 1065+ (571°C.+) | 0.47 | 55.28 | 16.56 |

The data of Table 1 shows that less than 2 percent of the product boils in the gasoline range or below even though all asphaltenes are removed and the sulfur content based on feed to the first hydrodesulfurization stage is reduced from 4 to 0.1 weight percent. Also, only about 16 percent of the product boils at 1065°F. (571°C.) or above. This proportion of 1065°F.+ material is sufficiently small to be vaporized by entrainment with lighter components in an equilibrium flash vaporization at the bottom of an FCC riser as long as all feed catalyst is charged to the bottom of the riser so that the flash vaporization temperature is as high as possible. In this manner, coking on the zeolite catalyst caused by non-vaporization of feed is inhibited. It is highly surprising that about 55 percent of the total product sulfur is in the 1065°F.+ (571°C.+) fraction of the product while the metals content of the product is reduced to the very low level of about 1.9 ppm, as shown below.

Table 2 shows the cumulative yield characteristics based on feed of the effluent from each of the three stages of the hydrodesulfurization process of FIG. 8 wherein the feed is passed downflow through a fixed stationary catalyst bed in each stage when charging a 650°F.+ (571°C.+) bottoms of an atmospheric distillation of a Kuwait crude containing 4 weight percent sulfur to the first stage.

TABLE 2

| HDS Effluent | First Stage | Second Stage | Third Stage | |
|---|---|---|---|---|
| Product Sulfur, Wt. % in | | | | |
| 650°F. +(343°C.+) | 1.0 | 0.5 | — | — |
| 375°F.+(191°C.+) | | | 0.3 | 0.1 |
| Average Yields Total C$_1$—C$_4$, Wt.% | 0.9 | 1.25 | 1.42 | 1.7 |
| C$_5$—375°F.(191°C.) Naphtha, Vol. % | 2.4 | 3.5 | 3.9 | 4.2 |
| 375-655°F. (191-346°C.) Distillate, Vol.% | 7.0 | 9.6 | * | * |
| Fuel Oil, Vol. % | | | | |
| 375°F.+(191°C.+) | — | — | 98.6 | 98.6 |
| 650°F.+(343°C.+) | 92.2 | 89.1 | — | — |

*Included in Fuel Oil

Table 2 shows that the effluent from each hydrodesulfurization stage comprises more than 98 volume percent of material boiling above the gasoline range and more than 89 or about 90 percent above 650°F. (343°C.) which is the IBP of the feed to the first stage. Therefore, the hydrodesulfurization process of this invention easily surpasses 80 to 90 percent or more of material based on feed boiling above the gasoline or naphtha boiling range.

Table 3 shows the fuel oil quality of the effluent from each hydrodesulfurization stage.

TABLE 3

| Effluent From stage | 1 | 2 | 2 | 3 |
|---|---|---|---|---|
| Sulfur in Effluent (%) | 1 | 0.5 | 0.3 | 0.1 |
| Residual Fuel Oil Boiling Range, °F. | 650+ (343°C.+) | 650+ (343°C.+) | 375+ (191°C.+) | 375+ (191°C.+) |
| °API Gravity | 21.8 | 22.0 | 24.5 | 26.0 |
| Viscosity, SUV at 100°F. (38°C.) | 680 | 490 | 435 | 320 |
| Pour Point, °F. | 70 (21°C.) | 60 (16°C.) | 20 (−7°C.) | 0 (−18°C.) |
| Carbon Residue, Rans., Wt. % | 5.4 | 4.0 | 3.3 | 2.2 |
| Metals (Ni+V), ppm | 20 | 6.0 | 2.0 | 0.3 |

An important aspect of the three-stage hydrodesulfurization process of this invention arising because it produces as asphalt-free residue product without any substantial loss of yield, i.e. at better than 98 volume percent yield above the gasoline range based on feed, is that its asphalt-free characteristic makes it a high quality lubricating oil feedstock despite the fact that it is a residual oil which has not been subjected to a solvent deasphalting step. Normally, in producing lubricating oil from a 1050°F.+ (565°C.+) residue, the 1050°F.+ (565°C.+) residue constitutes the lowest value portion of the total crude and in order to enhance its value, it is solvent deasphalted or distilled to separate therefrom as much potential asphalt-free lubricating oil feedstock as possible, since lubricating oil constitutes the most valuable portion of a crude petroleum stock. For example, a commercial refinery processing 250,000 barrels (29,750 m³) per day of full range crude oil, produces a normal commercial requirement of 13,000 barrels (1,547 m³) per day of lubricating oil. While the lubricating oil constitutes only about 5 volume percent based on crude oil feed to the refinery, it constitutes the highest value portion of the crude and its economic value as a lubricating oil is so high that this amount of lubricating oil accounts for 30 to 40 percent of the economic profit of the total refinery operation.

In order to constitute an acceptable residue feedstock for a lubricating oil hydrotreater to accomplish viscosity index improvement without a prior solvent extraction deasphalting step, the feedstock must (1) be free of asphalt, and (2) have no more than about 1 ppm metals, or less, in order to avoid excessive metals build-up on the lubricating oil hydrotreating catalyst which is typically Group VI–Group VIII metal (nickel-tungsten) on a cracking support such as silica-alumina. While the second stage hydrodesulfurization effluent fails to meet both of these qualifications, the third stage hydrodesulfurization effluent of this invention meets both of these commercial requirements. Furthermore, the third stage effluent meets these requirements without any appreciable loss in yield based on feed as compared to the second stage hydrodesulfurization effluent and also compared to hydrodesulfurizer feed. The economic significance of this type of upgrading in the third stage is illustrated by the following volumetric boiling range analysis of a typical 680°F.+ (360°C.+) virgin oil based on the original full crude:

| | |
|---|---|
| Volume percent of total 680°F.+ (360°C.+) based on crude | − 47 |
| Volume percent of 680 to 1040°F. (360 to 560°C.) based on crude | − 27 |
| Difference: Volume percent in 1040°F.+ (560°C.+) based on crude | − 20 |

In a usual asphaltene solvent extraction step commonly performed on the 1040°F.+ (560°C.+) material, which is too high boiling to be further distilled without decomposition, to prepare a lubricating oil feed, one-third is recovered from the asphalt as

| | |
|---|---|
| Lubricating oil feed, or expressed as volume percent based on crude | − 6.7 |
| The sovent extraction leaves as asphaltenes, expressed as volume percent based on crude | − 13.3 |

The above tabulation, based on a virgin or non-hydrodesulfurized crude, shows that 13.3 volume percent based on crude is not available for use as the most valuable crude oil product, i.e. lubricating oil feed, but is lost as asphalt, which is the least valuable crude oil product. On the other hand, the three-stage hydrodesulfurization process of the present invention converts essentially without yield loss, the 13.3 volume percent based on crude which is otherwise lost as low value asphaltenes into a non-asphaltene material of increased hydrogen to carbon ratio and makes it available for conversion to high viscosity index lubricating oil. These upgraded asphaltenes can be part of a total stream containing less than 1 ppm metals, which constitutes a commercially acceptable feed for a lubricating oil hydrotreater which is fully equivalent to a solvent-extracted deasphalted feed.

In summary, the present three-stage hydrodesulfurization process prepares an asphaltene-containing residue for use as a lubricating oil feed by upgrading the asphaltenes in the residue with little or no loss in yield, thereby increasing potential lubricating oil feed, rather than solvent extraction removal of the asphaltenes, which approach decreases potential lubricating oil feed.

In regard to an FCC feed stream, the threshold value of nickel equivalent in the feed (Ni + 1/5 V) is 1 ppm if the FCC feed stream is to be employed as a feed in a zeolitic FCC system without metals deposition on the zeolite being a limiting factor on catalyst make-up rate, as compared to a distillate gas oil feed. The catalyst make-up rate when charging a distillate gas oil through FCC is 0.2 pounds of zeolite catalyst per barrel of feed (571 g/m$^3$). This low catalyst make-up rate will maintain adequate zeolite catalyst activity over a prolonged period only if the FCC feed stream contains 1.0 ppm Ni + 1/5 V, or below. The effluent from the third stage of the hydrodesulfurization process is the only hydrodesulfurization effluent stream listed above whose metals level is sufficiently low (0.3 ppm of Ni plus V) that when it is employed as an FCC feed, the low zeolite make-up rate of 0.2 pounds of zeolite per barrel of feed (571 g/m$^3$) required for a distillate gas oil feed is adequate.

The total cumulative hydrogen consumption rates in SCF/Bbl (SCM/100L) after reaction in each of the three stages are as follows at SOR conditions: 580 SCF/Bbl (10.44 SCM/100L) to produce 1 percent S in the first stage, which increases to a cumulative total 800 SCF/Bbl (14.4 SCM/100L) to produce 0.3 percent S in the second stage and finally increases to a cumulative total of 900 SCF/Bbl (16.2 SCM/100L) to produce 0.1 percent S in the third stage.

Table 4 is a more complete tabulation of the feed characteristics to the first stage and the effluent characteristics from each hydrodesulfurization stage. The first column shows the feed characteristics to the first stage, the second column represents the first stage effluent, the third and fourth columns represent second stage effluents, depending upon second stage severity, and the fifth column represents the third stage effluent characteristics.

It is important in regard to the data of Table 4 that the third stage effluent illustrated in the product distillation comprises 98.6 volume percent of material boiling above the gasoline boiling range, indicating the non-hydrocracking nature of the process. It is also important that only the third stage effluent exhibits a nickel plus one-fifth vanadium level below the 1.0 ppm threshold level whereat metals level in an FCC feed stream no longer remains a controlling or limiting factor in the FCC zeolite catalyst make-up rate, which is 0.2 pounds of zeolite catalyst per barrel (571 g/m$^3$) when a distillate gas oil is charged to FCC. Therefore, although FIG. 12, which is explained below, shows that both the second and third stage effluents are capable of a higher gasoline selectivity at a given feed conversion level in FCC than a gas oil feed, the third stage effluent can provide this improved gasoline selectivity with no additional catalyst cost while the second stage effluent requires a higher zeolite use than a distillate gas oil.

Table 5 presents additional data from the effluent streams from the three hydrodesulfurization stages. The 1.0 percent sulfur product is from the first stage, the 0.5 and 0.3 percent sulfur effluents are both from the second stage, and the 0.1 percent sulfur level is from the third stage.

TABLE 4

|  | Feed* | First Stage Product | Second Stage Product | Second Stage Product | Third Stage Product |
|---|---|---|---|---|---|
| Sulfur: Wt. % | 3.8 | 1.0 | 0.5 | 0.3 | 0.1 |
| Nitrogen: Wt. % | 0.21 | 0.18 | 0.14 | 0.13 | 0.11 |
| Nickel: ppm | 15 | 7 | 2.5 | 1.1 | 0.2 |
| Vanadium: ppm | 45 | 12 | 3.5 | 0.8 | 0.1 |
| Gravity: °API | 16.6 | 22.5 | 23.8 | 24.5 | 26.0 |
| Vol. % Vacuum Dist. Temperature: °F. | | | | | |
| 5 | 616(324°C.) | 482(250°C.) | 479(248°C.) | 468(242°C.) | 464(240°C.) |
| 10 | 686(363°C.) | 602(316°C.) | 548(286°C.) | 543(284°C.) | 541(283°C.) |
| 20 | 740(393°C.) | 683(362°C.) | 646(341°C.) | 639(337°C.) | 636(335°C.) |
| 30 | 809(432°C.) | 745(396°C.) | 734(390°C.) | 726(385°C.) | 724(384°C.) |
| 40 | 871(466°C.) | 809(432°C.) | 792(422°C.) | 788(420°C.) | 778(414°C.) |
| 50 | 950(510°C.) | 876(468°C.) | 841(450°C.) | 842(450°C.) | 832(444°C.) |
| 60 | — | 942(505°C.) | 913(490°C.) | 905(485°C.) | 893(478°C.) |
| 70 | — | 1013(543°C.) | 1015(543°C.) | 981(527°C.) | 963(517°C.) |
| 80 | — | — | — | — | 1048(560°C.) |
| Carbon Residue (Ram): Wt. % | 8.3 | 4.8 | 3.8 | 3.3 | 2.2 |
| Aniline Point: °F. | — | — | 189(87°C.) | 189(87°C.) | 191(88°C.) |
| Heat of Combustion: Btu/lb | — | 19,000 (10,556 cal/g) | 19,200 (10,668 cal/g) | 19,250 (10,695 cal/g) | 19,350 (10,751 cal/g) |
| Pour Point: °F. | — | 60(15°C.) | 40(4°C.) | 20(6°C.) | 0(−17°C.) |
| Viscosity: SUV at °F. | | | | | |
| 100 (37°C.) | 3500 | 650 | 430 | 435 | 320 |
| 210 (98°C.) | 160 | 70 | 60 | 55 | 53.5 |
| Yield: Vol. % of HDS Charge | — | 99.9 | 98.8 | 98.6 | 98.6 |

*Kuwait 650°F.+ (343°C.+) atmospheric bottoms

TABLE 5

HDS UNIT YIELDS AND HYDROGEN CONSUMPTION WHEN PRODUCING 0.1–1.0% SULFUR CONTENT PRODUCTS OF 375°F.+(191°C.+)

Bases: Kuwait 650°F.+ (343°C.+) Charge, Run Average Data

| Sulfur Content of 375°F.+ (191°C.+) | Fuel Oil | FCC Charge Stock | | |
|---|---|---|---|---|
| HDS Product: % Wt. | 1.0 | 0.5 | 0.3 | 0.1 |
| Cumulative Yields: Wt. % of Charge | | | | |
| $H_2S$ | 3.2 | 3.5 | 3.8 | 3.9 |
| $NH_3$ | 0.03 | 0.04 | 0.06 | 0.1 |
| $C_1$–$C_4$ | 0.6 | 0.8 | 1.2 | 1.6 |
| Yields: Vol. % of Charge | | | | |
| $C_5$–375°F. (191°C.) Naphtha | 1.1 | 2.4 | 2.8 | 3.6 |
| 375°F.+(191°C.+) Product | 99.9 | 98.8 | 98.6 | 98.6 |
| Chemical Hydrogen Consumption: SCF/Bbl (SCM/100L) | 580(10.44) | 745(13.41) | 800(14.4) | 900(16.2) |
| Chemical Hydrogen Consumption at End-of-Run*: SCF/Bbl (SCM/100L) | 650(11.7) | 845(15.2) | 925(16.65) | 1050(18.9) |

*Used, along with solution loss.

The above data are noteworthy in that they show that the third stage produced only 0.1 weight percent of hydrogen sulfide, based on charge, indicating a dearth of hydrogen sulfide for purposes of maintaining the third stage catalyst in a fully sulfided condition. The data are also noteworthy in that they show less than four volume percent of the material in the third stage yield boiled in the naphtha range or lighter while more than 98 volume percent based on feed comprised material boiling above the naphtha range.

The FCC operation is performed by upflow of catalyst and reactant in a riser, as disclosed in U.S. Pat. No. 3,617,512 which is hereby incorporated by reference. The FCC reaction temperature is at least about 900°F. (482°C.). The upper limit can be about 1,100°F. (593°C.), or more. The preferred FCC temperature range is 950° to 1050°F. (510° to 565°C.). The FCC total pressure can vary widely and can be, for example, 5 to 50 psig (0.35 to 3.50 Kg/cm²), or preferably, 20 to 30 psig (1.40 to 2.10 Kg/cm²). The maximum residence time is 5 seconds and for most charge stocks the residence time will be about 1.5 or 2.5 seconds, or less commonly, 3 or 4 seconds. The length to diameter ratio of the FCC riser can very widely, but the riser should be elongated to provide a high linear velocity, such as 25 to 75 feet per second, and to this end a length to diameter ratio above 20 or 25 is suitable. The reactor can have a uniform diameter or can be provided with a continuous taper or a stepwise increase in diameter along the reaction path to maintain a nearly constant velocity along the flow path.

The FCC riser linear velocity, while not being so high that it induces turbulence and excessive backmixing, must be sufficiently high that substantially no catalyst accumulation or buildup occurs in the reactor, because such accumulation leads to backmixing. Therefore, the catalyst to oil weight ratio at any position throughout the reactor is about the same as the catalyst to oil weight ratio in the charge at the base of the reactor. Stated another way, catalyst and hydrocarbon at any linear position along the reaction path both flow concurrently at about the same linear velocity, thereby avoiding significant slippage of catalyst relative to hydrocarbon. A buildup of catalyst in the riser reactor leads to a dense bed and backmixing which in turn increases the residence time in the reactor and induces aftercracking for at least a portion of the cracked hydrocarbon. Avoiding a catalyst buildup in the reactor results in a very low catalyst inventory in the reactor, which in turn results in a high space velocity. Therefore, a space velocity of over 100 or 120 weight of hydrocarbon per hour per weight of catalyst inventory is highly desirable. The space velocity should not be below 35 and can be as high as 500, or more. Due to the low catalyst inventory and low charge ratio of catalyst to hydrocarbon, the density of the material at the inlet of the reactor in the zone where the feed and catalyst are charged can be an amount below 4 or 4.5 pounds per cubic foot (64.08 or 72.09 Kg/m³), although these ranges are nonlimiting, since this density range is too low to encompass dense bed systems which induce backmixing. Although conversion falls off with a decrease in inlet density to very low levels, the extent of aftercracking can be a more limiting feature than total conversion of fresh feed, even at an inlet density of less than 4 pounds per cubic foot (64.08 Kg/m³). At the outlet of the reactor the density will be about half of the density at the inlet because the cracking operation produces an increase in mols of hydrocarbon. The decrease in density through the reactor can be a measure of conversion.

Tables 6 and 7 below show the characteristics of the FCC product when the 375°F.+ (191°C.+) undiluted residue of the second stage (0.5 percent sulfur and 0.3 percent sulfur) hydrodesulfurization and the undiluted residue of the third stage (0.1 percent sulfur) hydrodesulfurization are charged to FCC.

TABLE 6

FCC UNIT YIELDS - PROCESSING KUWAIT HDS RESIDUA

Basis: 375°F.+ (191°C.+) Residua 0.1–0.5% Sulfur Content

| Sulfur Content of 375°F.+ (191°C.+) HDS Residua (FCC Charge): Wt. % | 0.5 | 0.3 | 0.1 |
|---|---|---|---|
| Effluent from HDS Stage | 2 | 2 | 3 |
| Yields: Vol. % of Charge | | | |
| Total $C_3$ | 13.7 | 13.7 | 13.6 |
| (Propylene) | (11.5) | (11.5) | (11.4) |
| Total $C_4$ | 17.5 | 17.7 | 17.9 |
| (Butenes) | (10.3) | (10.4) | (10.5) |

TABLE 6 — Continued

FCC UNIT YIELDS - PROCESSING KUWAIT HDS RESIDUA

| | | | |
|---|---|---|---|
| $C_5$—375°F. (191°C.) ASTM EP Naphtha | 54.2 | 55.3 | 56.7 |
| Light Gas Oil (375-650°F.) (191-343°C.) ASTM | 17.2 | 16.7 | 16.1 |
| Decanted Oil (650°F.+) (343°C.+) ASTM | 7.6 | 7.0 | 6.2 |
| Yields: Wt. % of Charge | | | |
| $H_2S$ | 0.10 | 0.06 | 0.02 |
| $H_2$ | 0.05 | 0.05 | 0.05 |
| $C_1 + C_2$ | 2.8 | 2.8 | 2.7 |
| (Ethylene) | (0.9) | (0.9) | (0.8) |
| Coke | 7.5 | 7.4 | 7.0 |
| Summary Yields | | | |
| Total $C_2$ & Lighter: Wt. % | 3.0 | 2.9 | 2.8 |
| Total $C_3$+ Liquid: Vol. % | 110.2 | 110.4 | 110.5 |
| Total Conversion: Vol. % | 75.2 | 76.3 | 77.7 |

TABLE 7

PRODUCT PROPERTIES - FCC PROCESSING OF KUWAIT HDS RESIDUA

Basis: 375°F.+ (191°C.+) Residua of 0.1–0.5% Sulfur Content

| | | | |
|---|---|---|---|
| Sulfur Content of 375°F.+(191°C.+) HDS Residua (FCC Charge): Wt. % | 0.5 | 0.3 | 0.1 |
| Effluent from HDS Stage | 2 | 2 | 3 |
| $C_5$—375°F. (191°C.) ASTM EP Naphtha | | | |
| °API Gravity | 59.0 | 59.0 | 59.0 |
| Sulfur: Wt. % | 0.03 | 0.02 | 0.01 |
| Aromatics: Vol. % | 25.0 | 28.5 | 29.5 |
| Olefins: Vol. % | 35.0 | 33.0 | 26.5 |
| Research O.N., Clear* | 95.0 | 96.8 | 94.8 |
| ASTM 10%: °F. | 95(35°C.) | 95(35°C.) | 95(35°C.) |
| 50% | 182(83°C.) | 182(83°C.) | 182(83°C.) |
| 90% | 300(148°C.) | 300(148°C.) | 300(148°C.) |
| Light Gas Oil | | | |
| °API Gravity | 23.2 | 23.2 | 23.2 |
| Sulfur: Wt. % | 0.68 | 0.45 | 0.19 |
| ASTM 10%: °F. | 460(237°C.) | 460(237°C.) | 460(237°C.) |
| 50% | 505(263°C.) | 505(263°C.) | 505(263°C.) |
| 90% | 580(304°C.) | 580(304°C.) | 580(304°C.) |
| Decanted Oil | | | |
| °API Gravity | 0.3 | 0.7 | 0.7 |
| Sulfur: Wt.% | 1.86 | 1.39 | 0.58 |
| ASTM 10%: °F. | 630(332°C.) | 630(332°C.) | 630(332°C.) |
| 50% | 751(400°C.) | 751(400°C.) | 751(400°C.) |
| 90% | 951(511°C.) | 951(511°C.) | 951(511°C.) |
| $SO_2$ Emission in Regenerator Flue Gas (ppm) | 230–380 | 140–230 | 50–180 |

*Based on 400°F. (204°C.) ASTM EP Gasoline

It is noted that feed streams to FCC must contain less than 0.3 and not more than about 0.1 or 0.15 weight percent of sulfur if the sulfur dioxide content in the regenerator stack gas is to meet projected commercial standards of low sulfur-dioxide content in the FCC catalyst regenerator stack gas, which are about 200 ppm of sulfur dioxide in the flue gas. The third stage effluent meets these projected standards but the second stage effluents do not, as shown by the following data taken from Table 7.

| Weight Percent Sulfur in Feed Oil to FCC | PPM by Volume $SO_2$ in FCC Regenerator Flue Gas |
|---|---|
| 0.5 | 230 – 380 |
| 0.3 | 140 – 230 |
| 0.1 | 50 – 180 |

Moreover, the 0.3 weight percent sulfur second stage effluent resulted in a distillate light gas oil, following FCC, of 0.45 weight percent sulfur, which is far above the prevailing commercial specifications of 0.25 weight percent sulfur for home heating oil. Therefore, the 0.45 weight percent distillate gas oil must undergo further hydrodesulfurization following the FCC step to meet commercial requirements. However, Table 7 shows that the test employing the third stage effluent as the FCC feed produced an undiluted distillate fuel oil product containing only 0.19 weight percent sulfur, which meets the 0.25 weight percent sulfur commercial specification for home heating oil, so that this light gas oil does not require further hydrodesulfurization following FCC but can be used directly as home heating oil. The FCC decanted oil of the third stage effluent contained only 0.58 weight percent sulfur, which is expected based upon the very low sulfur dioxide make in the FCC regenerator. Therefore, when charging the third stage effluent to FCC no further hydrodesulfurization reactor is required following FCC. All hydrodesulfurization occurs in advance of the FCC step, providing the double advantage of minimizing the sulfur dioxide content in the regenerator flue gas, thereby meeting commercial flue gas sulfur dioxide requirements as a concomitant advantage to obviating the requirement for an additional undiluted fuel oil hydrodesulfurization unit downstream from the FCC unit in addition to the hydrodesulfurization process of this invention.

EXAMPLE SHOWING THE ADVANTAGE OF FCC OF THE THIRD STAGE HYDRODESULFURIZATION EFFLUENT

The following data were obtained when cracking a feed in a zeolite riser comprising entirely a South Louisiana distillate gas oil which was free of residue.

| Riser Conditions | |
|---|---|
| Riser outlet temp., °F. | 1,000 (537°C.) |
| Contact time, sec. | 4.6 |
| Cat/Oil | 9-10 |
| Feed Preheat, °F. | 520-550 (271-287°C.) |
| Catalyst | Zeolite |
| Yields: Vol. % F.F. | |
| Total $C_3$'s | 15.5 |
| $C_3$ | 2.2 |
| $C_3 =$ | 13.0 |
| Total $C_4$'s | 21.6 |
| $iC_4$ | 7.0 |
| $nC_4$ | 1.3 |
| $C_4 =$ | 13.3 |
| Gasoline | 57.9 |
| LCGO } D.O. } | 18.9 |
| Yields: Wt. % F.F. | |
| $C_2$ and Lighter | 3.1 |
| Coke | 5.1 |
| Total $C_3$+: Vol. % F.F. | 113.9 |
| Conversion: Vol. % F.F. | 81.1 |
| FCC+ $C_3$ + $C_4$ Alkyl. Gasoline: | |
| Vol. % F.F. | 103.9 |

FCC cracking tests were conducted employing three different hydrodesulfurized residual oil feeds, to illustrate the advantage of the present invention. Following is a tabulation of the characteristics of these hydrodesulfurized feeds.

| Description of FCC Feed | Hydrodesulfurized 375°F.+(191°C.+) Residuums | | |
|---|---|---|---|
| FCC Feed Number Inspections | 1 (2-stage effluent) | 2 (2-stage effluent) | 3 (3-stage effluent) |
| Gravity: °API | 23.7 | 23.8 | 26.4 |
| Sulfur: Wt. % | 0.51 | 0.35 | 0.15 |
| Carbon Res., Rams.: Wt. % | 4.02 | — | 2.20 |
| Aniline Point: °F. | 191 (88°C.) | 195.5 (91°C.) | 190.5 (88°C.) |
| Nitrogen: ppm | 1500 | 1400 | 990 |
| Metals: ppm | | | |
| Nickel | 2.4 | 1.0 | 0.7 |
| Vanadium | 3.6 | 1.4 | 0.6 |
| Distillation: °F. at | | | |
| 10% | 596 (313°C.) | 543 (284°C.) | 585 (307°C.) |
| 30% | 730 (387°C.) | 726 (385°C.) | 716 (380°C.) |
| 50% | 845 (452°C.) | 842 (450°C.) | 831 (444°C.) |
| 70% | 995 (535°C.) | 981 (527°C.) | 976 (524°C.) |
| 90% | 1140 (615°C.) | — | 1087 (637°C.) |

The above data show the third stage hydrodesulfurization effluent is the only effluent having a nickel equivalent metals content (ppm nickel plus 1/5 the ppm vanadium) of less than 1, which is the threshold FCC feed metals content whereby the zeolite catalyst make-up rate in FCC will be no higher than 0.2 pounds of zeolite catalyst per barrel of fresh feed (571 g/m$^3$), which is approximately the make-up rate requirement when charging a distillate gas oil feed to FCC to maintain high catalyst activity. This means that at a feed metals nickel equivalent of one or lower, and preferably 0.6 or lower, the feed metals content is not the controlling factor in zeolite make-up rate in FCC, but high catalyst activity maintenance is controlling in zeolite make-up rate. Since the nickel equivalent in the above third stage effluent FCC feed is below one, this criterion is met. The above data also show a sharp drop in nitrogen level in passage of the residue through the third stage. Nitrogen is mainly present in asphaltenes and the absence of asphaltenes from the third stage effluent accounts for this drop in nitrogen level. A drop in nitrogen level is important because nitrogen is a principal factor in color bodies in petroleum oils and because nitrogen is known FCC zeolite catalyst deactivator.

Following are five FCC cracking runs made with the hydrodesulfurized residuum oils of the above table. The first three cracking runs reported below were made with FCC feed number 1 of the above table, the fourth cracking run reported below was made with FCC feed number 2 of the above table, and the fifth cracking run reported below was made with FCC feed number 3 of the above table.

ZEOLITE RISER CRACKING OF HDS KUWAIT 375°F.+(191°C.+) RESIDUUMS

| Sulfur Content of Residuum: Wt. % | ← 0.51 → | | | ← 0.35 → | ← 0.15 → |
|---|---|---|---|---|---|
| Operating Conditions | | | | | |
| Contact Time: sec. | 1.3 | 2.7 | 2.7 | 2.6 | 4.0 |
| Riser Outlet Temp.: °F. | 1020(548°C.) | 1020(548°C.) | 1000(537°C.) | 1000(537°C.) | 1000(537°C.) |
| Feed Preheat: °F. | 700(371°C.) | 700(371°C.) | 683(362°C.) | 692(366°C.) | 600(315°C.) |
| Cat/Oil Ratio: Wt/Wt F.F. | 11.3 | 10.0 | 8.5 | 8.5 | 8.6 |
| Carbon on Reg. Cat.: Wt. % | 0.20 | 0.20 | 0.15 | 0.23 | 0.18 |
| Product Yields: Vol. % F.F. | | | | | |
| Propane | 1.7 | 2.5 | 2.2 | 2.2 | 2.2 |
| Propylene | 10.0 | 11.6 | 11.5 | 12.0 | 13.0 |
| Butanes | 3.7 | 8.6 | 7.2 | 7.7 | 9.1 |
| Butenes | 10.5 | 15.3 | 10.3 | 11.0 | 12.9 |
| Deb. Gasoline (430 TBP EP) | 61.8 | 57.4 | 57.2 | 59.1 | 59.6 |
| LCGO (430-650 TBP) | 16.8 | 12.3 | 14.8 | 13.1 | 10.0 |
| Decant Oil | 6.7 | 5.9 | 7.6 | 7.1 | 6.2 |
| Total $C_3$+ Liquid | 111.2 | 113.6 | 110.8 | 112.2 | 113.0 |
| Product Yields: Wt. % F.F. | | | | | |
| $C_2$ and Lighter | 2.1 | 2.6 | 3.0 | 2.9 | 2.3 |
| Coke | 5.9 | 6.5 | 7.4 | 6.6 | 6.5 |
| Conversion to Gasoline and Lighter Products: Vol. % F.F. | 76.5 | 81.8 | 77.6 | 79.8 | 83.8 |
| Gasoline Blend Stock: Vol. % F.F. ($C_3$+$C_4$ Alkylate + Deb. Gaso.) | 97.7 | 104.4 | 96.0 | 99.4 | 104.9 |
| Debutanized Gasoline | | | | | |
| Gravity: °API | 57.0 | 57.0 | 55.6 | 55.0 | 57.4 |
| Sulfur: Wt. % | 0.04 | 0.04 | 0.04 | 0.03 | 0.014 |

—Continued
ZEOLITE RISER CRACKING OF HDS KUWAIT 375°F.+(191°C.+) RESIDUUMS

| Hydrocarbon Type: Vol. % | | | | | |
|---|---|---|---|---|---|
| Aromatics | 28.0 | 31.0 | 28.0 | 31.5 | 32.5 |
| Olefins | 35.0 | 29.5 | 35.0 | 33.0 | 26.5 |
| Saturates | 37.0 | 39.5 | 37.0 | 35.5 | 41.0 |
| Octane Numbers | | | | | |
| Motor Clear | 80.1 | 82.2 | 81.5 | 81.3 | 82.2 |
| M + 3 g Pb | 85.0 | 87.9 | 86.5 | 86.6 | 89.3 |
| Research Clear | 94.9 | 94.7 | 95.0 | 95.2 | 95.4 |
| R + 3 g Pb | 99.0 | 101.0 | 100.2 | 101.0 | 100.7 |
| Distillation: °F. at | | | | | |
| 10% | 139( 59°C.) | 133( 56°C.) | 136( 57°C.) | 136( 57°C.) | 137( 58°C.) |
| 50% | 220(104°C.) | 210( 98°C.) | 214(101°C.) | 215(101°C.) | 207( 97°C.) |
| 90% | 356(180°C.) | 360(182°C.) | 373(190°C.) | 381(194°C.) | 343(173°C.) |
| EP | 402(205°C.) | 410(210°C.) | 449(232°C.) | 455(235°C.) | 399(204°C.) |
| Furnace Oil (LCGO) | | | | | |
| Gravity: °API | 20.9 | 16.6 | 17.9 | 16.5 | — |
| Sulfur: Wt. % | 0.70 | 0.30 | 0.68 | 0.45 | — |
| Distillation: °F. at | | | | | |
| 10% | 450(232°C.) | 450(232°C.) | 483(251°C.) | 492(255°C.) | — |
| 50% | 495(257°C.) | 510(265°C.) | 519(271°C.) | 533(278°C.) | — |
| 90% | 545(285°C.) | 580(304°C.) | 590(310°C.) | 602(316°C.) | — |
| EP | 617(325°C.) | 645(341°C.) | 652(344°C.) | 656(346°C.) | — |
| Decant Oil | | | | | |
| Gravity: °API | 7.1 | −2.0 | 4.7 | 4.5 | — |
| Sulfur: Wt. % | 1.95 | 2.10 | 1.86 | 1.39 | — |
| Distillation: °F. at | | | | | |
| 10% | 658(347°C.) | 590(310°C.) | 595(313°C.) | 617(325°C.) | — |
| 50% | 755(402°C.) | 725(385°C.) | 726(385°C.) | 743(395°C.) | — |
| 90% | 967(520°C.) | 965(518°C.) | 928(497°C.) | 949(510°C.) | — |
| EP | 1050(565°C.) | 1050(565°C.) | 1087(582°C.) | 1091(587°C.) | — |

Figure 12:
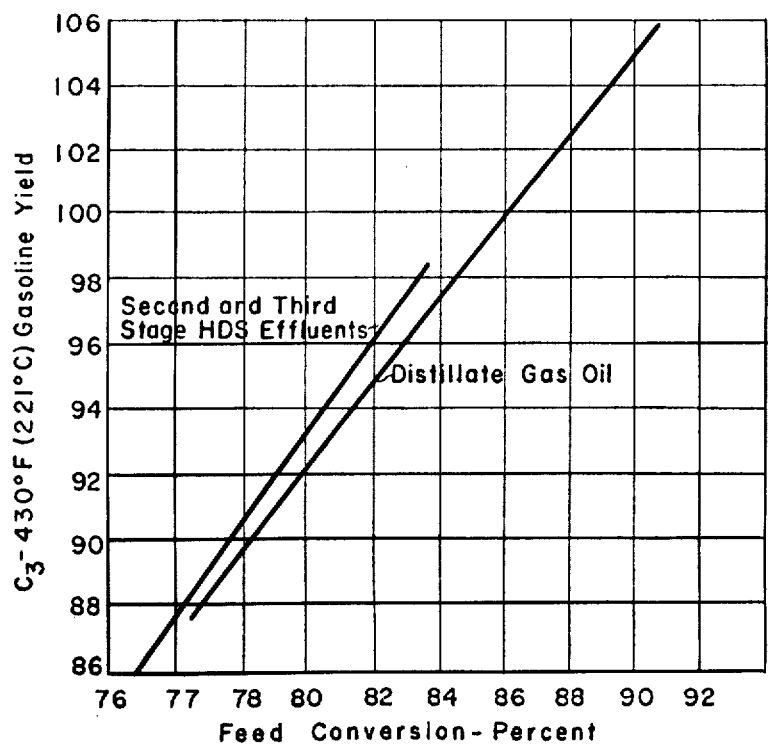

FIG. 12 shows summary results of still other FCC tests and shows that although the second stage and third stage hydrodesulfurization effluents produced about the same gasoline selectivity, both resulted in a greater $C_3$-430°F. (221°C.) gasoline yield at any given conversion level than is obtained upon FCC of a virgin gas oil. The inclusion of $C_3$ product in the gasoline yield incorporates potential alkylate gasoline in the results. This higher selectivity of hydrodesulfurized residuum may be due to the fact that the hydrodesulfurized effluent undergoes very little saturative hydrogenation (consuming less than 900 to 1000 SCF (16.2 to 18.0 SCM/100L) of hydrogen per barrel or less), while removing 90 to 95 weight percent of the sulfur in the feed, thereby retaining the refractory cracking nature of a residual oil, residual oils being more refractory than lower boiling gas oils. Being more refractory, in FCC the gasoline produced from the hydrodesulfurized residual oil is less apt to overcrack to lighter products than is the gasoline produced from a gas oil FCC feed, whereby a higher $C_3$ - 430°F. (221°C.) gasoline yield at any given conversion level is achieved with the hydrodesulfurization effluent of this invention.

The upper curve of FIG. 12 represents FCC gasoline selectivity data for both a second stage hydrodesulfurization effluent having about 0.3 weight percent sulfur and a third stage hydrodesulfurization effluent having about 0.1 weight percent sulfur. Although both the second and third stage hydrodesulfurization effluents provide about the same gasoline selectivity in FCC in the tests of FIG. 12 because these tests were short cycle tests and were terminated before the catalysts were metals-poisoned, it is reiterated that only the third stage hydrodesulfurization effluent is capable of providing the higher gasoline selectivity over virgin gas oil in FCC illustrated in FIG. 12 during a lengthy commercial operation with no greater zeolite catalyst make-up rate than is required with a gas oil feed. In a long-term commercial FCC operation, the operation employing the second stage effluent would be metals-poisoning limited due to metals content in the feed stream, so that the undesirable products of hydrogen and coke with the second stage hydrodesulfurized effluent would tend to increase relative to the third stage effluent FCC feed or the second stage effluent feed would require a greater zeolite catalyst make-up rate than is required with distillate gas oil to maintain the high gasoline selectivity in FCC relative to a distillate gas oil shown in FIG. 12. Also, as shown in Table 7, the third stage effluent having 0.1 weight percent sulfur provided an undiluted fuel oil FCC product having less than 0.25 weight percent sulfur, thereby meeting commercial sulfur requirements for home heating fuel, whereas the second stage hydrodesulfurization effluent was incapable of producing an undiluted fuel oil from FCC meeting this commercial requirement, requiring an additional hydrodesulfurization unit for the second stage fuel oil fraction after FCC. Finally, the third stage effluent FCC produced a zeolite regenerator flue gas effluent containing less than 200 ppm of sulfur dioxide, thereby meeting commercial requirements in this regard, the second stage hydrodesulfurization effluent (having 0.35 weight percent sulfur) produced a regenerator flue gas having more than 240 ppm of sulfur dioxide, thereby failing to meet commerical requirement in this regard.

We claim:

1. A process for hydrodesulfurizing a feed residual petroleum oil containing asphaltenes, metals and sulfur in a plurality of stages in series including an initial stage and a final stage each operating at a hydrogen pressure above 1,000 psi and at a temperature between about 650° to 800°F., each stage employing a catalyst comprising Group VI and Group VIII metals on alumina, the catalyst in said final stage comprising a higher weight percent of Group VI and Group VIII metals than the catalyst in said initial stage, increasing the temperature in each stage with increasing catalyst age to compensate for catalyst activity aging loss, maintaining a lower hydrogen pressure in said final stage than in said initial stage, removing asphaltenes, metals and sulfur from the feed oil in said initial and said final stages with a greater amount of sulfur and of metals being removed from the feed oil in said initial stage than in said final stage, said process producing hydrodesulfurized effluent with a smaller total amount of catalyst than if said initial and final stages operated at the same hydrogen pressure and with catalyst having the same percent of Group VI and Group VIII metals to achieve the same amount of desulfurization.

2. The process of claim 1 wherein the final temperature in said initial and final stage is about the same and is reached at about the same time in process operation.

3. The process of claim 1 wherein the hydrodesulfurized effluent comprises more than 90 volume percent boiling above the gasoline range based on feed.

4. The process of claim 1 wherein the hydrodesulfurized effluent comprises more than 95 volume percent boiling above the gasoline range based on feed.

5. The process of claim 1 wherein the hydrodesulfurized effluent comprises more than 98 volume percent boiling above the gasoline range based on feed.

6. The process of claim 1 wherein the initial stage catalyst deactivation is due primarily to saturative metals-loading on the catalyst and the final stage catalyst deactivation is due primarily to coke formation on the catalyst.

7. The process of claim 6 wherein said saturative metals-loading occurs when the most saturated portion of the catalyst contains 40 to 50 weight percent of Group VI plus Group VIII metals plus metals deposited from the feed oil.

8. The process of claim 1 wherein the termination catalyst age is at least 6 barrels of feed oil per pound of catalyst in a stage.

9. The process of claim 1 wherein the termination catalyst age is at least 10 barrels of feed oil per pound of catalyst in a stage.

10. The process of claim 1 wherein the termination catalyst age is at least 12 barrels of feed oil per pound of catalyst in a stage.

11. The process of claim 1 wherein the hydrogen pressure in the final stage is in the range 1400 to 1600 psi and the hydrogen pressure in the initial stage is above this range.

12. The process of claim 1 wherein the hydrogen pressure in the final stage is 1400 to 1700 psi and the hydrogen pressure in the initial stage is above this range.

13. In the process of claim 1, passing said feed oil through said process while the feed oil demetallization-/desulfurization ratio decreases in said initial stage with increasing catalyst age.

14. The process of claim 1, including a hydrodesulfurization stage between said initial and final stages.

* * * * *